United States Patent
Gallistel

(10) Patent No.: US 11,271,466 B1
(45) Date of Patent: Mar. 8, 2022

(54) MAGNETIC GEARING COMPONENT HAVING A MAGNETIC CORE WITH HELICAL ENDCAPS

(71) Applicant: Anthony A. Gallistel, Omaha, NE (US)

(72) Inventor: Anthony A. Gallistel, Omaha, NE (US)

( * ) Notice: Subject to any disclaimer, the term of this patent is extended or adjusted under 35 U.S.C. 154(b) by 0 days.

(21) Appl. No.: 17/463,720

(22) Filed: Sep. 1, 2021

Related U.S. Application Data

(60) Provisional application No. 63/076,353, filed on Sep. 9, 2020.

(51) Int. Cl.
    *H02K 49/10* (2006.01)
    *H02K 1/06* (2006.01)
    *H02K 49/00* (2006.01)

(52) U.S. Cl.
    CPC ............. *H02K 49/102* (2013.01); *H02K 1/06* (2013.01); *H02K 49/00* (2013.01); *H02K 49/10* (2013.01)

(58) Field of Classification Search
    CPC ...... H02K 49/00; H02K 49/10; H02K 49/102; H02K 1/06
    USPC .......................... 310/75 R, 89, 103, 112, 113
    See application file for complete search history.

(56) References Cited

U.S. PATENT DOCUMENTS

| | | | |
|---|---|---|---|
| 687,292 A | 11/1901 | Armstrong | |
| 750,009 A | 1/1904 | Thordon | |
| 1,084,148 A | 1/1914 | Hugenin | |
| 1,333,451 A | 3/1920 | Henry | |
| 1,337,723 A | 4/1920 | Stoller | |
| 2,243,555 A | 5/1941 | Faus | |
| 2,548,373 A | 4/1951 | Hurvitz | |
| 2,635,483 A | 4/1953 | Welsh | |
| 3,523,204 A | 8/1970 | Rand | |
| 3,864,587 A | 2/1975 | Landry | |
| 4,850,821 A | 7/1989 | Sakai | |
| 5,013,949 A | 5/1991 | Mabe, Jr. | |
| 5,381,456 A * | 1/1995 | Vetter | F16C 17/107 378/132 |
| 5,483,570 A * | 1/1996 | Renshaw | A61B 6/4488 378/132 |
| 5,569,967 A | 10/1996 | Rode | |
| 6,047,456 A | 4/2000 | Yao et al. | |
| 6,278,355 B1 * | 8/2001 | Hopkinson | H01F 27/2823 336/223 |
| 7,024,963 B2 | 4/2006 | French | |
| 2002/0079998 A1 * | 6/2002 | Blange | B03C 1/12 335/302 |
| 2008/0205804 A1 * | 8/2008 | Jeng | F16C 17/107 384/123 |
| 2012/0194021 A1 | 8/2012 | Nakatsugawa et al. | |

(Continued)

FOREIGN PATENT DOCUMENTS

| | | |
|---|---|---|
| CN | 102969866 A | 3/2013 |
| CN | 103023274 A | 8/2015 |

OTHER PUBLICATIONS

International Search Report & Written Opinion for PCT/US2021/048602 dated Nov. 26, 2021.

*Primary Examiner* — Rashad H Johnson
(74) *Attorney, Agent, or Firm* — Nasr Patent Law LLC; Faisal K. Abou-Nasr

(57) ABSTRACT

This document discloses a means of toothed magnetic gearing with improved dynamic efficiency. In embodiments, a magnetic gearing component comprises: a magnetic core; an endcap adjacent to the magnetic core; and a plurality of helical flutes formed on a surface of the endcap.

20 Claims, 19 Drawing Sheets

(56) References Cited

U.S. PATENT DOCUMENTS

2016/0380525 A1 12/2016 Leas
2019/0085941 A1* 3/2019 Klassen .............. F16H 57/0416

* cited by examiner

MAGNETIC GEARING COMPONENT HAVING A MAGNETIC CORE WITH HELICAL ENDCAPS

CROSS-REFERENCE TO RELATED APPLICATIONS

The present application claims the benefit of U.S. Provisional Application No. 63/076,353 filed Sep. 9, 2020 and titled "Magnetic Gearing," which is incorporated by reference in its entirety.

TECHNICAL FIELD

The present disclosure relates to gearing and more particularly to a means of toothed magnetic gearing.

BACKGROUND

Toothed gears are utilized in many systems or devices to actuate chains, belts, or other gears. However, with mechanical gearing, pitch diameters must be integer multiples of the chosen pitch for any given mesh, or a systemic failure is assured. Magnetic meshes are more forgiving and can readily sustain operations with imperfectly matching meshes. This is one advantage provided by the means of toothed magnetic gearing disclosed herein.

SUMMARY

This document discloses a means of toothed magnetic gearing with improved dynamic efficiency. In embodiments, a magnetic gearing component comprises: a magnetic core; an endcap adjacent to the magnetic core; and a plurality of helical flutes formed on a surface of the endcap. In some embodiments, the plurality of helical flutes converge with a second plurality of helical flutes formed on a surface of a second endcap. In some embodiments, the magnetic gearing component also includes a separation layer between the endcap and the second endcap.

Objectives of the magnetic gearing disclosed herein may include, but are not limited to: obtaining a dynamic mesh between at least two machine components via at least one toothed magnetic engagement; reducing engagement losses by providing alternate flux paths with nearly equal low impedance to the flow of magnetic flux; biasing the torque transmitted or obtained in a preferred rotational direction; teaching or entertaining people with novel magnetically interacting effects; obtaining a homopolar electric current proportional to machine component interactions for sensing or other useful purposes; and optionally obtaining torque transmission means having mesh engagement selectively or controllably governed by electromagnetic means.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

Figure 1A:
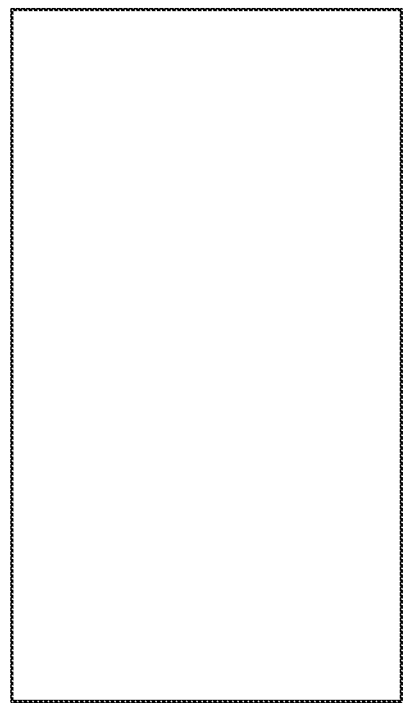
FIG. 1A is an outline of a cylindrical or substantially cylindrical machine component, in accordance with one or more embodiments of this disclosure.
Figure 1B:
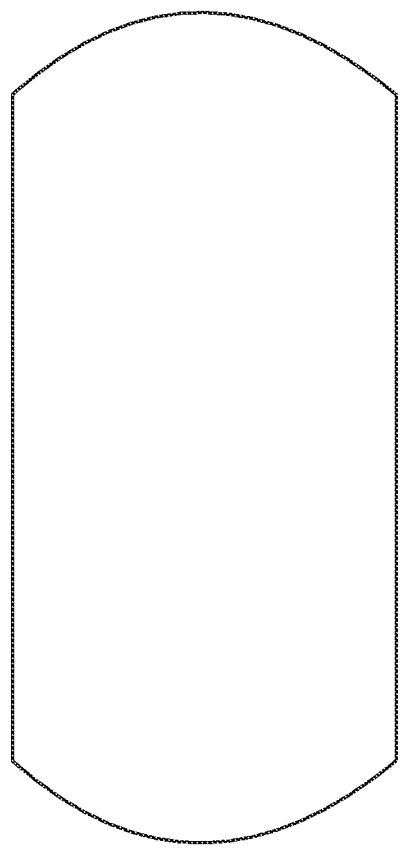
FIG. 1B is an outline of a cylindrical or substantially cylindrical machine component, in accordance with one or more embodiments of this disclosure.
Figure 1C:
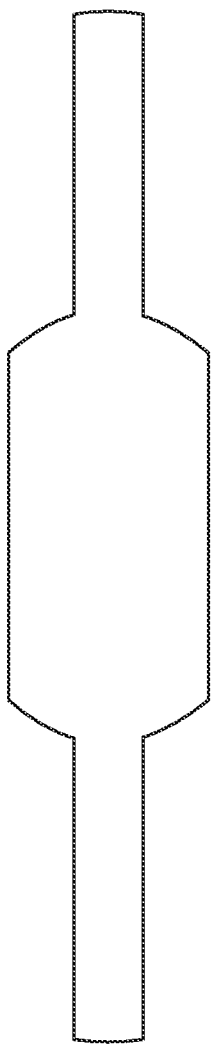
FIG. 1C is an outline of a cylindrical or substantially cylindrical machine component, in accordance with one or more embodiments of this disclosure.
Figure 2A:
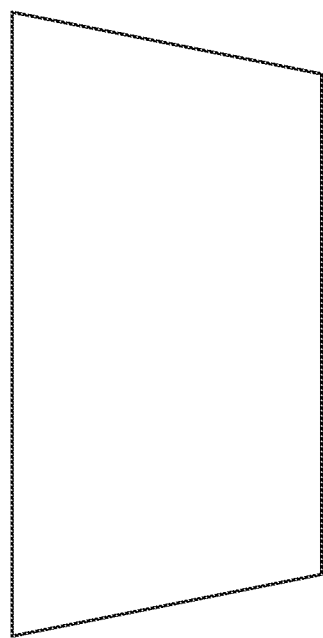
FIG. 2A is an outline of bevel gear, in accordance with one or more embodiments of this disclosure.
Figure 2B:
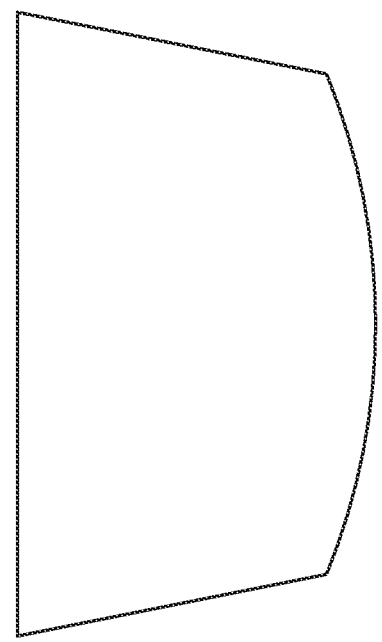
FIG. 2B is an outline of bevel gear, in accordance with one or more embodiments of this disclosure.
Figure 2C:
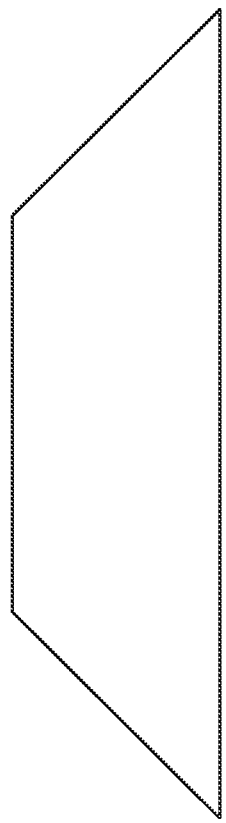
FIG. 2C is an outline of bevel gear, in accordance with one or more embodiments of this disclosure.

To assist with the understanding of examples and embodiments described herein, definitions for certain terms or phrases are provided below. The definitions are as follows:

Cylindrical or substantially cylindrical: A machine component having typically two end surfaces and a generally circular surface between. This definition specifically includes true cylinders, tapered cylinder forms, barrel shapes, and cylindrical shapes in which the circular surface has a concavity, as well as extreme taper forms such as the frustum of a cone used in bevel gears, plate or platter gears, etc. For the purpose of this disclosure the term substantially cylindrical shall also be understood to mean geometric forms ring like in their form. For the purposes of this disclosure the term substantially cylindrical shall be understood to include spiral, thread like geometric forms. FIGS. 1A through 1C are outlines of several examples of cylindrical or substantially cylindrical machine components, and FIGS. 2A through 2C are outlines of several examples of bevel gears, in accordance with various embodiments of this disclosure.

Endcap: The general meaning of an endcap specifies a geometric form having an end surface and a circumferential sleeve surface contiguous and this general term describes one geometry for a specific embodiment of the herein disclosed means. For the purposes of this disclosure the geometric form of said endcap may also feature a central hole of any diameter for the purpose of passing a central axle, or for any other useful purpose, said hole may be of any dimension up to or even exceeding the diameter of the core such that the general form of the endcap more nearly matches the general for of just the sleeve formed of at least one but preferably a plurality of tooth like magnetically permissive forms.

Magnetic core: In this disclosure a magnetic core is a portion of a machine component having a unified polar magnetic field. Said magnetic field may be permanently impressed by electromagnetic coercion or electromagnetically induced by conductive coil, or both. Said magnetic core is typically centered in the interior region of a given machine component however, said magnetic core may less preferably be axially central to a given machine component while mutually being distal from the interior region being rather, integral with or proximate to, or rigidly attached to at least one end of said machine component, preferably being at least two distal cores at or near opposed axial ends of said machine component.

Core field: A core magnetic field, typically a permanently impressed magnetic field, optionally being a magnetic field derived in whole or in part from electromagnetism.

Flux conducting path: A flux circuit is typically described as contiguous loops of magnetic force connected through magnetically permeable materials. A flux conducting path comprises a portion of at least one flux circuit.

Internal flux conducting path: Is a flux circuit component internal to or rigidly attached to a given machine component.

External flux conducting pathway: Is a component of a flux circuit external to any given machine component, being instead a flux conducting path internal to any other machine component enmeshed with said given machine component.

Helical tooth form: Helical spur gears have mechanically meshing tooth forms which exhibit smooth efficient operation due to the increased continuity of their meshing. The meshing of machine components of this disclosure are magnetic, preferably tooth like in their individual forms, and preferably helically aligned to the central axis of any given machine component in this disclosure.

Helical tooth pattern: The plain meaning of a helical form is a form having a combination of a linear form and a circular form, typically in relation to a given central axis with a specified diameter and pitch or lead angle. In this disclosure the plain meaning applies being further specified by "tooth like" meaning that while a single flute, channel, or addendum may be specified, more preferably several flutes, channels, or addendums are to be arranged in any given preferred embodiment of machine component in a manner like a helical gear or multi start thread. Typically, a given machine component such as specified in this disclosure will also have an orientation and displacement from a given core magnetic field such that a gradient of intensity in magnetic field strength is present along the length of the at least one but preferably the plurality of tooth like forms. In the special case wherein a helical tooth like form is manifested only as a specifically demagnetized region or set of regions within the corpus of a machine component the tooth like form of a conducting flux channel is present even though it has no external visible form, said form being none the less sensible to appropriate sensing means.

Herringbone pattern: The herringbone pattern is comprised of at least one but preferably several pair of helically pitched teeth having opposed helical angles. These angles converge near the middle of the machine components (e.g., gears) in a series of arrowheads.

In this disclosure the term helical or herringbone pattern also refers to arrowhead like patterns or hash mark patterns of tooth like magnetic fields associated with both rings and racks or rails. A straight rack like machine component with an attached or integral arrowhead or hash mark pattern is not normally considered to have the radial form factor necessary to fit the ordinary definition of a helical pitch but such racks or rails may be considered to have infinite radii in order that these substantially straight machine components may have tooth like magnetic patterns suitable for meshing with helical or herringbone tooth like magnetic elements of mutually meshing machine components such as at least one but preferably a plurality of substantially cylindrical form machine components having a true helical or herringbone pitch pattern.

Separation layer: Air has a low permittivity to the flow of magnetic flux and for this reason air gaps between tooth-like magnetically permissive tooth like elements of any given machine component serve to separate the flow of flux and confine said flow to the channel of the tooth like form. Other materials have even less permittivity and these materials may be used to increase the definition of the magnetic field form. In some embodiments there is also described a tube or sleeve layer surrounding the core material and the endcap form. This separation layer typically has the function of improving the flux channel confinement of the internal flux conducting pathway but may serve any useful purpose such as adhesion, conduction, or improved manufacturability.

Racks and rails: In mechanical gearing a rack is typically a straight geometric form with a plurality of tooth like forms worked upon at least one surface typically meshing with a cylindrically shaped pinion. In this disclosure a rack is similarly a substantially straight geometric form with at least one but more preferably a plurality of magnetic cores and at least one but preferably a plurality of tooth like magnetically active tooth like forms worked upon at least one surface. Similarly, in this disclosure a rail may be considered a rack of indeterminate length also allowing for a degree of incline, decline, or curvature in its longitudinal length. Because a magnetically active substantially cylindrical helically or more preferably herringbone pitched machine component can efficiently mesh with any plain metal form including racks and rails not having cores or tooth-like forms the plain and ordinary meaning of a rail is also incorporated in the definitions of this document.

Planetary configurations: The plain meaning of a planetary gearing mechanical gear set typically includes at least two but preferably all three components of the following: a sun gear, planetary gears, and a ring gear. In this disclosure the meaning of planetary meshing is more broad encompassing machine component systems comprised of at least two of sun like, planetary like, and/or a ring like machine component, referred to as a single layer planetary system, as well as a system comprised of at least one sun like machine component, at least one but preferably several cylinder components mutually meshing with a further layer of substantially cylindrical machine components, and a ring like machine component, referred to as a double roller layer planetary system, as well as a system substantially comprised of at least one sun like machine component, mutually meshing with a plurality of substantially cylindrical machine components typically arranged in three mutually meshing roller layers, said triple layers outer layer typically meshing with a ring like machine component, referred to as a triple roller layer configuration.

A single layer of substantially cylindrical machine components, rollers, with or without a sun like element function in a manner similar to a roller bearing. A single roller layer configuration made according to the art of this disclosure may still convey a degree of torque by virtue of any torque bias induced in the meshing of the rollers and other machine components.

A double layer of rollers mutually meshing can, if properly pitch diameter related move between a ring and sun like component but may, or may not, affirmatively transfer torque between said sun and ring.

A triple layer of rollers mutually meshing if properly pitched will affirmatively transmit torque between a sun like machine component and a ring like machine component.

More than three layers of rollers are possible and even numbered layers may move between ring and sun if properly pitch diameter related, while odd numbered layers of rollers can affirmatively transmit torque. Multiple nested sets of rollers and rings in various configurations are further encompassed in the meaning of planetary meshing or gearing systems as disclosed herein.

Magnetic gearing pitch diameter addendum; Pitches and pitch diameters in magnetic gearing: A mechanical gear tooth has a root, pitch diameter and addendum. The magnetic tooth like forms of the herein disclosed means typically have no addendum projecting above the pitch diameter. The pitch diameter and meshing surface being substantially the same. In a great many configurations of magnetically meshing machine components, it is possible and preferable to constrain the mesh between components to an even integer multiple of a given pitch. However, in contrast to mechanical gearing where pitch diameters must be integer multiples of the chosen pitch for any given mesh, or a systemic failure is assured magnetic meshes are more forgiving and can readily sustain operations with imperfectly matching meshes. None the less, if systems of mesh in any given embodiment of the herein disclosed means have good cyclic repetition the function of the machine will be smoother, stronger, and relatively free from vibratory effect. This quality of mismatching mesh pitch is most obvious in situation where a substantially cylindrical machine component having a plurality of magnetically charged tooth like flutes worked upon its substantially cylindrical surface continuously meshes with a plain machine component magnetically susceptible machine component like a rack, rail, or ring. In this configuration the mesh may be understood to be primarily a capstan contact type mesh facilitated in some part by magnetic force.

In a preferred embodiment of the herein disclosed art wherein a single layer of magnetically charged and toothed rollers continuously mutually meshes with a sun like machine component and a ring like machine component the pitch diameter of the sun, ring, and rollers can readily be chosen to have perimeter values which are integer multiples of a common pitch just as is done in mechanical gearing. However, as previously stated the pitch match can in the present case be between all three such components, any two, or only one of the three.

In preferred configurations of preferred embodiments wherein two or more layers of substantially cylindrical magnetically charged and toothed rollers mutually mesh with one another and also with one or more other machine components, it is always preferable that the pitches be uniform and pitch diameters integer multiples of the systemic pitch, but this result is not always possible. In such cases, a close pitch match system will still be found to perform better if the systemic pitch is matched to the extent possible. In multiple layer roller systems of transmission, the mesh between adjacent and mesh engaged rollers is primarily determined by the diameter of the peripheral surfaces which are in physical contact and capstan engagement. In order that these multiple capstan layers progress or recess about a sun like machine component the roller centers must progress at a pace determined by the orbital radius of the planetary rollers center relative to the sun like machine components center. The calculation of this fixed geometric ratio relationship can be easily calculated through computer modeling for any desired system, but, because it is a ratio determined by cylindrical surfaces meshing and cylindrical surfaces have a fixed relation to circular diameters or radii, it obtains that rollers in more than one layer mutely meshing with one another and other machine components will have a substantially fixed ratio of their diameters. Our modeling has found that this fixed capstan meshing ratio is nearly about 1 to 1.05 plus or minus 0.01 or still more preferably substantially 1 to 1.054 plus or minus 0.01 or still more preferably about 1 to 1.0541 plus or minus 0.02.

Because this multi-layer capstan ratio is fixed by geometric physical constraint, it is preferable to allow this physical constraint to dominate and to allow any deviation from ideal magnetic mesh parameters to deviate from their ideal expressions. For example, consider the case of a magnetically meshing planetary gearing system comprised of at least a solar component at least three mutually meshing planetary roller layers wherein said outer roller layer is also mutually meshing with at least one ring like machine component wherein it is a design preference that all said machine components are both physically capstan meshing and mutually magnetically meshing with a substantially uniform pitch among their several physical diameters. If the absolute value of the difference between the drive and driven values of the capstan ratio is taken the result is; 1 minus 1.054=0.054 and the reciprocal of this delta is taken, the result is about 18.48. This result indicates that a pitch of 37 is an approximate integer value for the pitch of the helical teeth being specified.

As a practical matter it is difficult to manufacture very finely spaced magnetic teeth. For this reason, as a design preference in this case the designer reduces the pitch integer value of the magnetically meshing inner roller layer to 9 resulting in a capstan ratio determined pitch of nearly 9.5, for the second planetary roller layers pitch and 10 for the outer layer. Since 9.5 is not an integer value some other value must substitute. A pitch of 10 might seem attractive, but it is found from modeling or experience that this choice results in a rhythmic or cyclic mismatch between the 2nd and 3rd layers. If 9.5 is divided by two the result is 4.75 and if this value is rounded up to a pitch of 5, the overall system performance is found to be smoother.

In a final compromise the diametral pitch of the 3rd layer can be exactly matched to the outer ring like machine component and any resulting mismatch absorbed in the magnetic mesh between the inner most planetary set and the sun like machine component.

Another method of pitch match conflict resolution could be to pitch match the sun and first layer as well as the 3rd and outer ring and using an untoothed 2nd layer of the correct capstan diameter to transfer torque through that layer without the benefit of pitch matching.

Other mesh matching methods that are known to those skilled in the art are considered incorporated herein.

Separation layer: at least three distinct types of separation layer are specified in this disclosure. An air gap has a low permittivity to the flow of magnetic flux and may serve as a separation layer. Bronze is often preferred as a thin, often plated or braised separation layer. In any preferred embodiment herein described a separation layer between any given core magnetic material and any endcap may serve to confine the flux conducting pathway to passage through said endcap. In any given embodiment a second type of separation layer may be made between the individual tooth like forms. In substantially all herringbone bone patterned toothed magnetically charged embodiments a midsection separation layer between opposed helical patterns of said herringbone pattern should be present to so impede the internal flux conducting pathway of any given machine component such that, when possible, said conducting flux will take an external meshing pathway.

Ring like machine component: In mechanical gearing the ring gear has a pitched tooth pattern on either the inside radial surface or the outside radial surface or both. Less commonly a ring gear may have toothed pitch pattern on a radial facing surface. In this document ring like machine component refers to a machine component with a geometric form like a ring and also to geometric forms like ellipsis, triangular constant diameter forms, mobius curve like forms, or any similar continuous closed curve form.

Sun like machine component: The plain meaning of a sun gear machine component specifies its central location in a planetary gearing system and implies a single solid form. In this disclosure sun like includes this meaning but also may specify a centrally located ring machine component.

Substantially comprised of: This phrase specifies that the subsequent description of any given preferred embodiment describes the essential novel art of this claim of invention. It is implied and it is to be understood that most fully realized machines typically utilize a great many generic machine components such as are common knowledge to those skilled in the art of machine design which are included in the specification of the means of this disclosure by virtue of their common essential functionality. Exemplar machine components of this generic type may include axles, bearings, seals, housings mounts, gears, wiring and external electrical or electronic control circuitry, among many others.

Brake plate: While a brake plate is just such a generic machine component it is not typically considered as an essential component of transmission systems. In the case of most magnetically meshing systems as herein described due to the accumulated torque bias such as may be present at all times in a permanent magnet type embodied system. Designers should pro forma include a brake plate of some type in these constructions. Further, since the incomplete but assembled transmission means may self-initiate and autorotate the assembly work area should include a magnetically susceptible metal work surface and similar flooring.

With reference to FIGS. 2D through 8, preferred embodiments are now described. The machine components of this disclosure (including, but not limited to, magnetic gearing components) may embody any of the many forms typically seen in mechanical gearing, such as components meshing in a manner like spur gears, planetary gearing, ring, and spur gearing, bevel gears and gear clusters. These are examples of several of the many gearing configurations such as are common knowledge to those skilled in the arts of mechanical design.

Preferred configurations for the application of the magnetic meshing means of this disclosure include, but are not limited to rack and pinion, ring and pinion, spur gearing, and planetary gearing configurations.

The most basic substantially cylindrical machine component of this disclosure is substantially comprised of a single cylindrical body having a magnetic core, said magnetic core being preferably coercively impressed on a magnetically susceptible material, said magnetic core being alternatively created by an electric current in a conductive coil, said magnetic core being polar, said polar magnetic core field being typically aligned with the central axis of said cylinder, said core magnetic field not extending the full length of said cylinder. Being instead terminated with an endcap region 104 of said cylinder, said core magnetic field further not extending the full diameter of said cylinder instead having about said cylinders peripheral surface a sleeve like specially demagnetized region, continuous with said endcap(s), Preferably said pair of endcaps being separated by a groove made to substantially the depth of the core field material region at or near the axial midsection of said substantially cylindrical machine component.

Note: The special demagnetizing of this component is dissimilar from the common knock back demagnetization cycle commonly used to stabilize permanent magnets. The demagnetized region preferably covers the entire exterior of the form to a depth sufficient to in total carry substantially all the magnetic flux of the core. Although lacking the defined flux conducting paths preferably present in a herringbone pattern the demagnetized peripheral surface does comprise a flux conducting path and the special use of this non fluted or channeled flux conducting path is in a mesh with any channeled or fluted machine component.

The use of the non-pitched mesh supports better mechanical and magnetic meshing without creating any mismatch of pitch diameters. For this reason, it may be understood that in the art of this disclosure it is the special function of this embodiment that makes it novel rather than just the specific geometric form of the magnetized and demagnetized regions.

The optional but strongly preferable midsection groove serves as a separation layer in the internal flux conducting pathway of this machine component. Increasing the flux impedance of the internal conducting channel increases the degree to which the core flux of this machine component is exchanged with any meshing machine component. This improves the torque transmission and torque bias in the mesh.

Figure 2D:
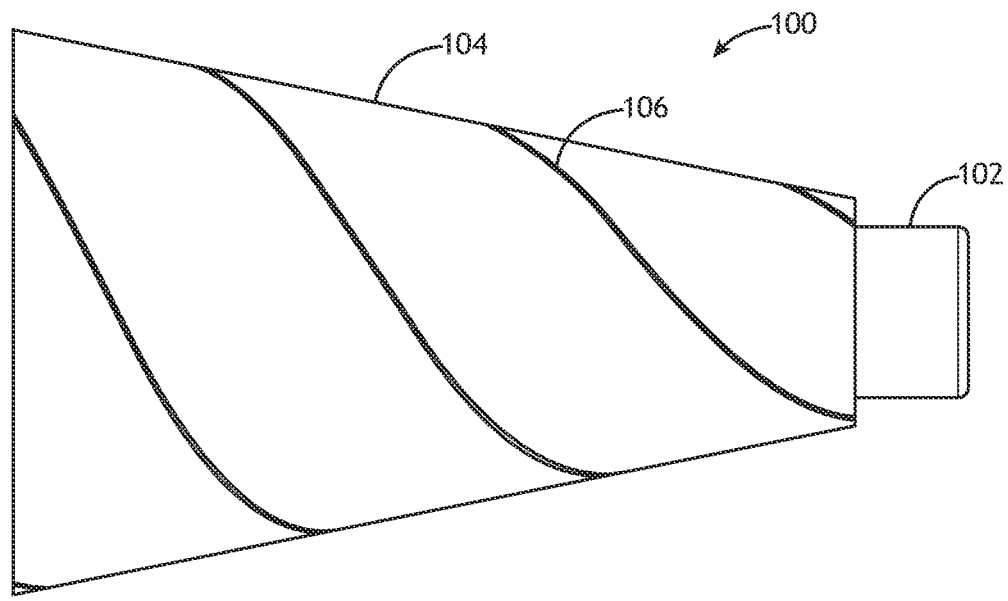
FIG. 2D is a top view of a magnetic gearing component with one endcap, in accordance with one or more embodiments of this disclosure.
Figure 2E:
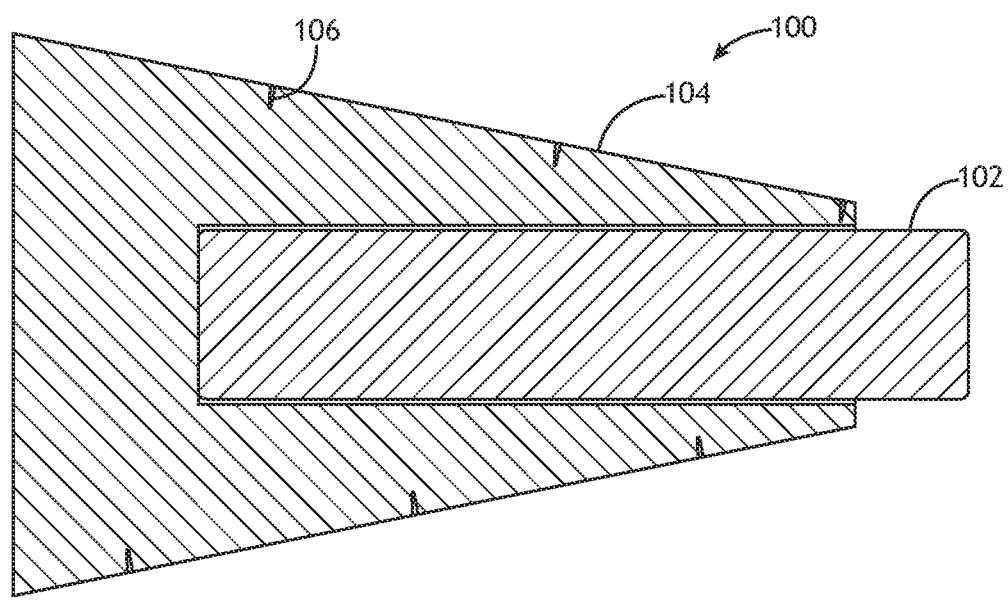
FIG. 2E is a cross-sectional view of the magnetic gearing component of FIG. 2D, in accordance with one or more embodiments of this disclosure.

As shown in FIGS. 2D and 2E, in embodiments, a machine component 100 includes a magnetic core 102; an endcap 104 adjacent to the magnetic core 102; and a plurality of helical flutes 106 formed on a surface of the endcap 104.

Figure 3A:
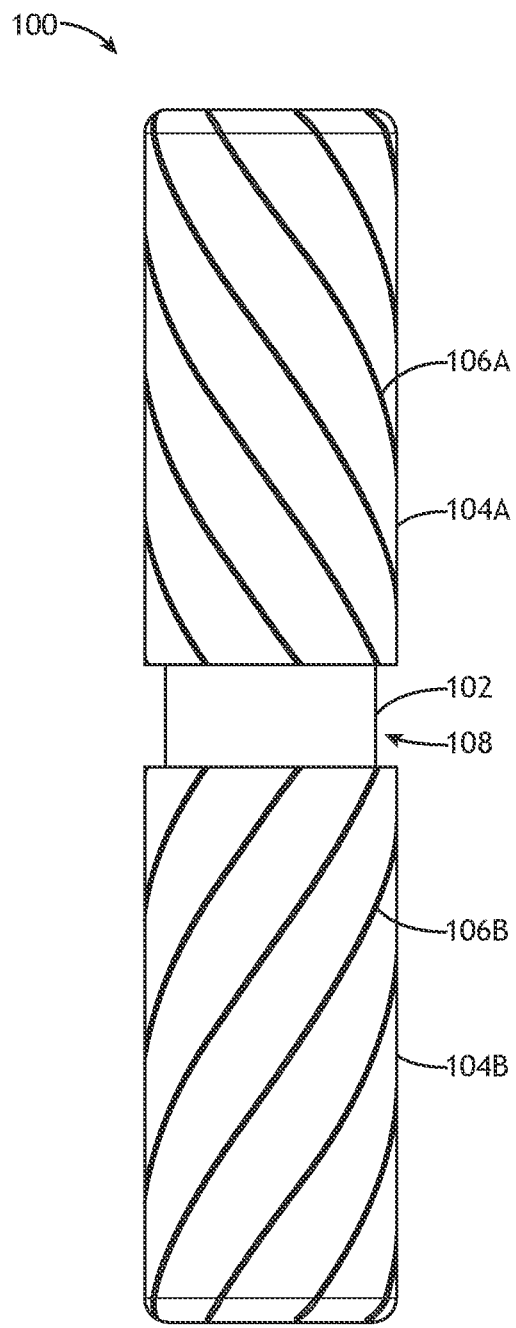
FIG. 3A is a top view of a magnetic gearing component with two endcaps, wherein the endcaps are formed from specially demagnetized regions of the magnetic gearing component, in accordance with one or more embodiments of this disclosure.
Figure 3B:
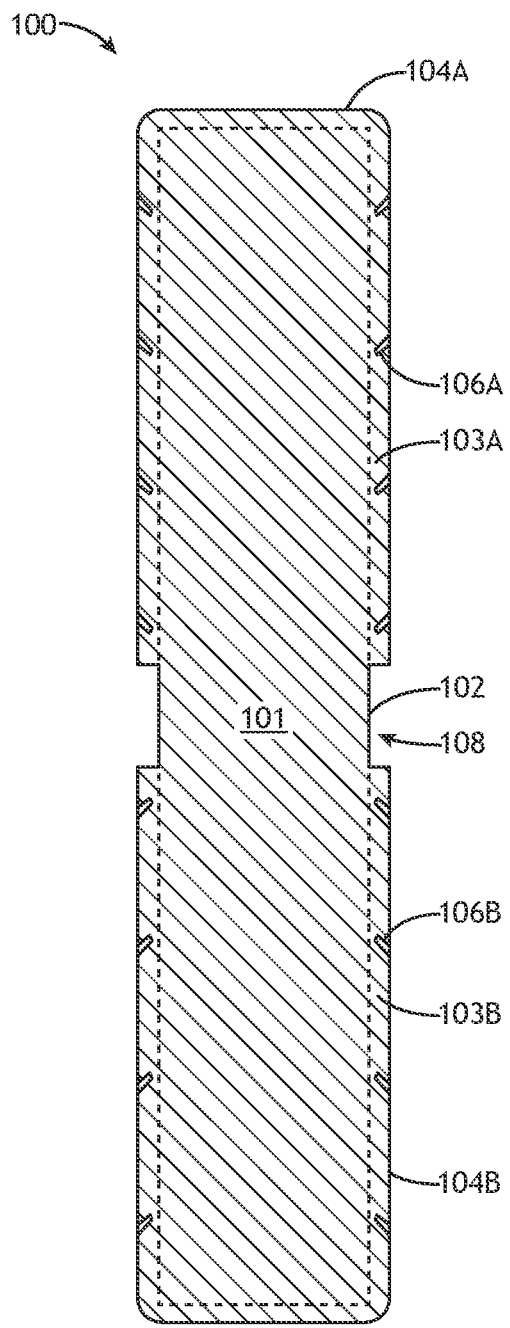
FIG. 3B is a cross-sectional view of the magnetic gearing component of FIG. 3A, in accordance with one or more embodiments of this disclosure.

Referring now to FIGS. 3A and 3B, a preferred embodiment of a substantially cylindrical machine component 100 is substantially comprised of a magnetic core 102, said magnetic core 102 being preferably coercively impressed on a magnetically susceptible material, said magnetic core 102 being alternatively created by an electric current in a conductive coil, said magnetic core being polar, said polar magnetic core field being typically aligned with the central axis of said cylinder, said core magnetic field not extending the full length of said cylinder. Being instead terminated with an endcap region 103A/103B of said cylinder 102, said core magnetic field further not extending the full diameter of said cylinder instead having about said cylinders radially peripheral surface at least one specially demagnetized helically pitched flux conducting path 106A/106B, said at least one helical flux conducting path 106A/106B being preferably several helically pitched conducting paths 106A/106B, said helical paths 106A/106B being still more preferably two pairs of oppositely angled helical flux conducting paths 106A and 106B converging near the axial midsection of said cylindrical body, said helically opposed converging flux conducting channels being preferably separated from one another by a groove 108 made to a depth of substantially said core magnetic field region 101.

In this embodiment, the endcaps 104A and 104B comprise the specially demagnetized regions 103A and 103B of the peripheral surface of the machine component 100, and the magnetic core 102 comprises a magnetized region 101 of the machine component 100.

In this embodiment or substantially any other described herein, the optional midsection separation groove 108 may be improved in its separation function by bronze fill or bronze plating. Additionally, if the homopolar current generation or conduction of a meshing system is of utility this functionality can be improved by filling the midsection separation groove 108 with a good electrical conductor such as copper.

In this embodiment, the opposed lead angles may curl in the manner of a person's left hand or in the manner of the fingers of the right hand. In the magnetically attractive mode, the best mesh is obtained between two left hand components with opposed magnetic pole orientations, or between two right hand rule mess having opposed magnetic poles. Left and right hand herringbone patterns mesh much less well than matched patterns.

Another preferred embodiment of a substantially cylindrical machine component 100 is substantially comprised of a coerced permanent magnetic core 102, said core being preferably polar, said polar coerced magnetic field being preferably aligned with the central axis of said substantially cylindrical machine component 100, said core magnetic field preferably not extending the full length of the cylinder but instead terminating in an endcap region 103A/103B (endcap 104A/104B) specially demagnetized, said core magnetic field additionally preferably not extending the full diameter of said cylinder but instead the peripheral regions of at least one but preferably both ends of said cylinder being specially demagnetized along at least one but more preferably an opposed pair of helical flux conducting pathways 106A and 106B, said at least two opposed helical flux conducting pathways 106A and 106B being still more preferably a plurality of helically pitched tooth like flux conducting pathways 106A and 106B converging on the midsection of said substantially cylindrical form.

Figure 3C:
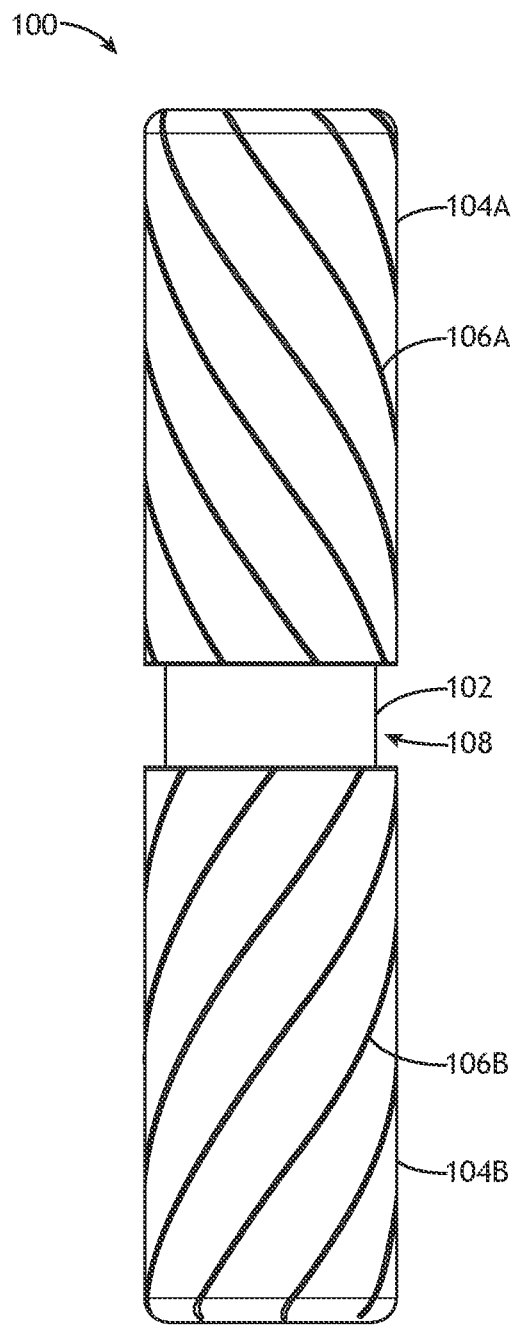
FIG. 3C is a top view of a magnetic gearing component with two endcaps, wherein the endcaps are formed from a different material than a magnetic core of the magnetic gearing component, in accordance with one or more embodiments of this disclosure.
Figure 3D:
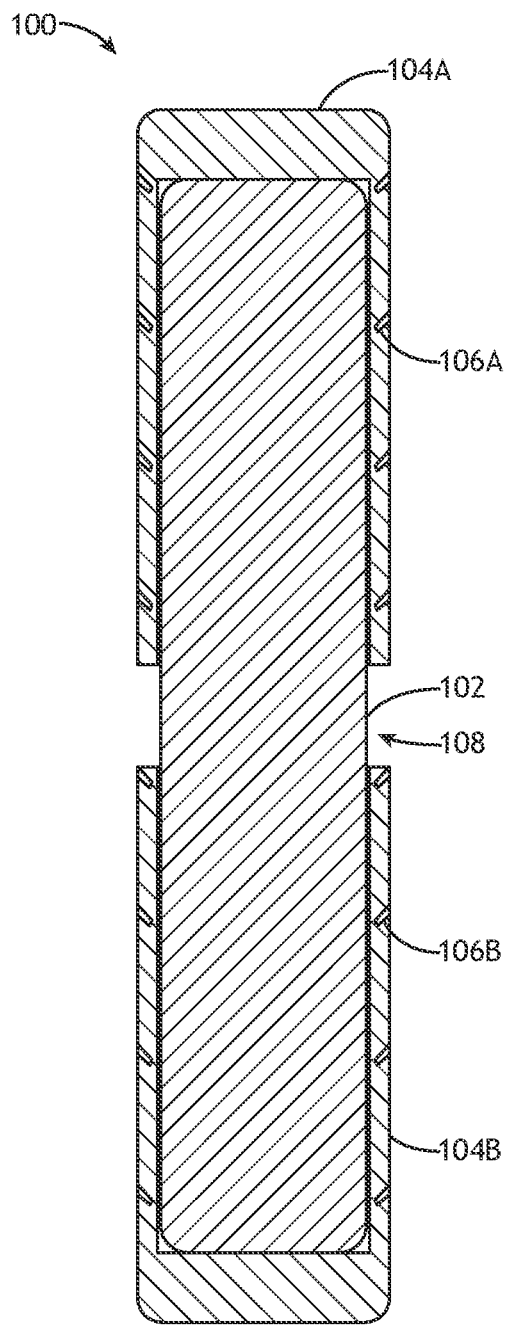
FIG. 3D is a cross-sectional view of the magnetic gearing component of FIG. 3C, in accordance with one or more embodiments of this disclosure.

Referring now to FIGS. 3C and 3D, another preferred embodiment of a magnetically meshing machine component 100 is substantially comprised of a magnetic core 102, typically a permanently coerced magnetic field impressed upon a suitably retentive material, said field being preferably polar, said core magnetic field being typically aligned with the central axle of said machine component 100, said core magnetic field preferably not extending the full length of said machine component 100, said core magnetic field rather extending to and through an endcap region comprising the distal axial ends of said machine component 100, said endcaps 104A and 104B being contiguous with or integrally made with or proximate to at least one but preferably a plurality of opposed pairs of physically formed flux conducting channels 106A and 106B, said physically formed flux conducting channels 106A and 106B preferably having a herringbone channel pattern converging near the axial midsection of said machine component 100, said flux conducting channels being preferably separated from one another by a separation layer 108, said separation layer 108 being substantially comprised of a material resistant to the passage of magnetic flux such as air, bronze or similar, said flux conducting channels 106A and 106B comprising an internal flux conducting pathway, said internal flux conducting pathway being optionally separated from one another by a groove or other mid-section separation layer 108 near the axial midsection of said machine component 100, said midsection separation layer 108 being optionally filled with an electrically conductive material 100.

Another preferred embodiment of the herein disclosed means is substantially comprised of at least one substantially cylindrical machine component 100 having a magnetic core 102, peripheral endcaps 104A and 104B magnetically conductive, said endcaps having at least one but preferably at least a pair of opposed helical internal flux conducting channels 106A and 106B, said flux conducting channels 106A and 106B being optionally separated near the axial midsection of said machine component 100, said machine component's exterior surfaces being bronze plated, said bronze plating being selectively removed at least over the exterior peripheral surfaces of said internal flux conducting channels 106A and 106B.

It is noted that bronze plating improves the containment of the conducting flux to the intended channels 106A and 106B and the selective removal improves the transmission of the conducting portion of the flux circuit to the external meshing conducting path present in any mutually meshing component.

Another preferred embodiment of the herein disclosed means is substantially comprised of a machine component 100 having at least one magnetic core 102, said core being either electromagnetic or permanent or both, said core 102 being internal to at least one but preferably a pair of opposed endcaps 104A and 104B, said endcaps 104A and 104B being comprised of at least one material body transmissive of magnetic flux, said endcap(s) 104A/104B preferably having at least one helical flute 106A/106B or channel worked upon at least one of its exterior surfaces typically at least one of its cylindrical surfaces, said endcaps 104A and 104B preferably having a gap 108 between one another near the midsection of said machine component 100, said midsection being preferably filled with at least one conductive material layer or coil.

Figure 3E:
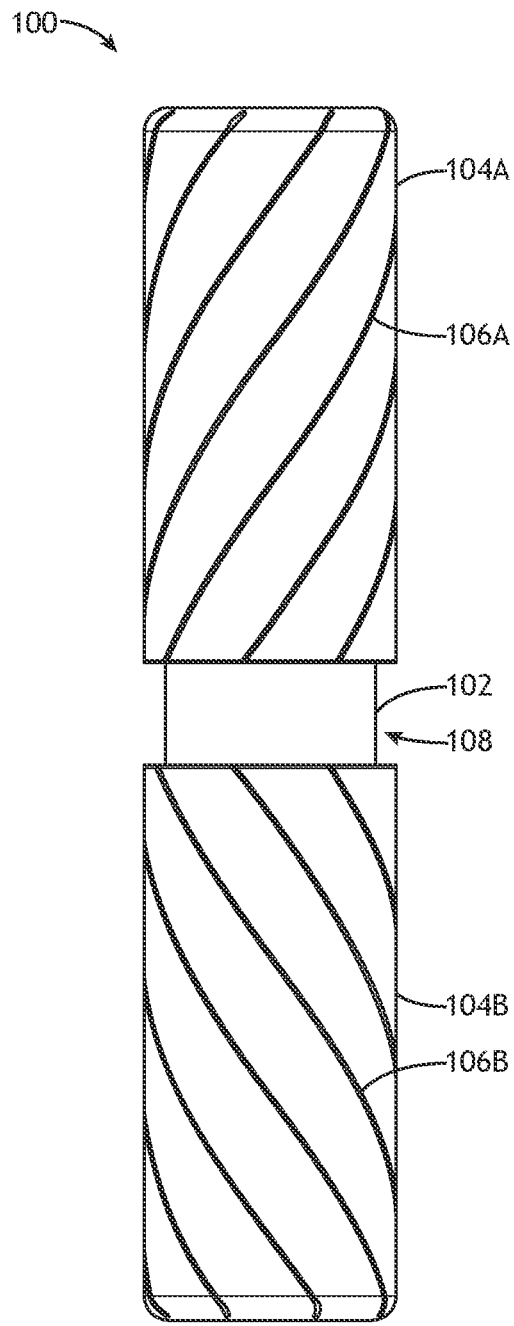
FIG. 3E is a top view of a magnetic gearing component with two endcaps, wherein the endcaps are formed from a different material than a magnetic core of the magnetic gearing component, and wherein the magnetic core is formed from two or more cores including a permanent magnet and an electromagnet, in accordance with one or more embodiments of this disclosure.
Figure 3F:
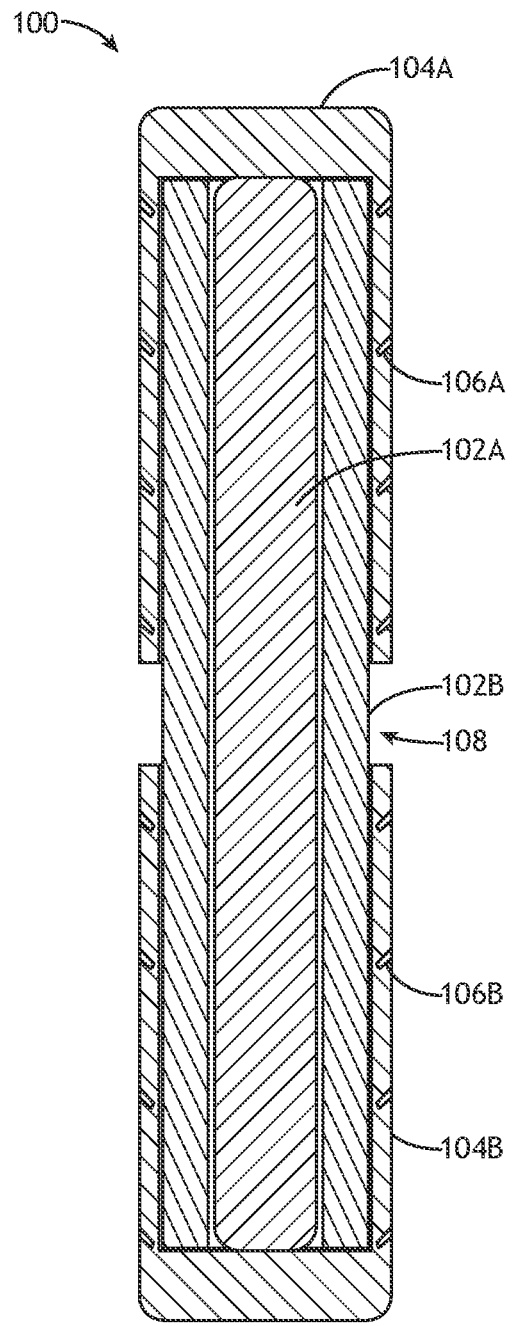
FIG. 3F is a cross-sectional view of the magnetic gearing component of FIG. 3E, in accordance with one or more embodiments of this disclosure.

Referring now to FIGS. 3E and 3F, optional configurations include a pair of magnetic cores 102 separated by a flux conductive material comprising a core, an electrically conductive coil 102B surrounding a magnetically conductive material forming a magnetic core 102A, said electrically conductive coil 102B forming a separation layer between said core 102A and said endcap 104A/104B or caps 104A and 104B, said electrically conductive coil 102B being energized by direct, alternating, induced, or homopolar electric currents or some combination of such currents, said endcaps 104A and 104B being preferably but optionally bronze plated, said endcaps 104A and 104B having said optional bronze plating selectively removed from areas intermediate between said core 102A and said endcaps 104A and 104B, said bronze plating being preferably selectively removed from the peripheral surfaces of said internal flux conducting channels 106A and 106B.

Figure 3G:
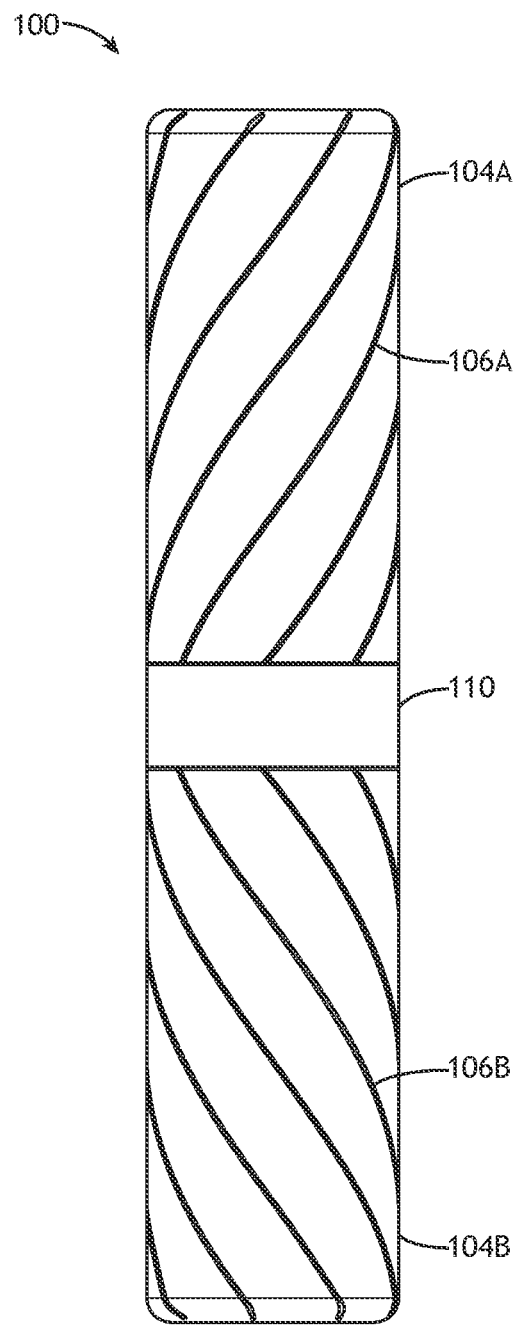
FIG. 3G is a top view of a magnetic gearing component with two endcaps, wherein the endcaps are formed from a different material than a magnetic core of the magnetic gearing component, wherein the magnetic core is formed from two or more cores including a permanent magnet and an electromagnet, and wherein the separation layer is filled with a midsection conductor; in accordance with one or more embodiments of this disclosure.
Figure 3H:
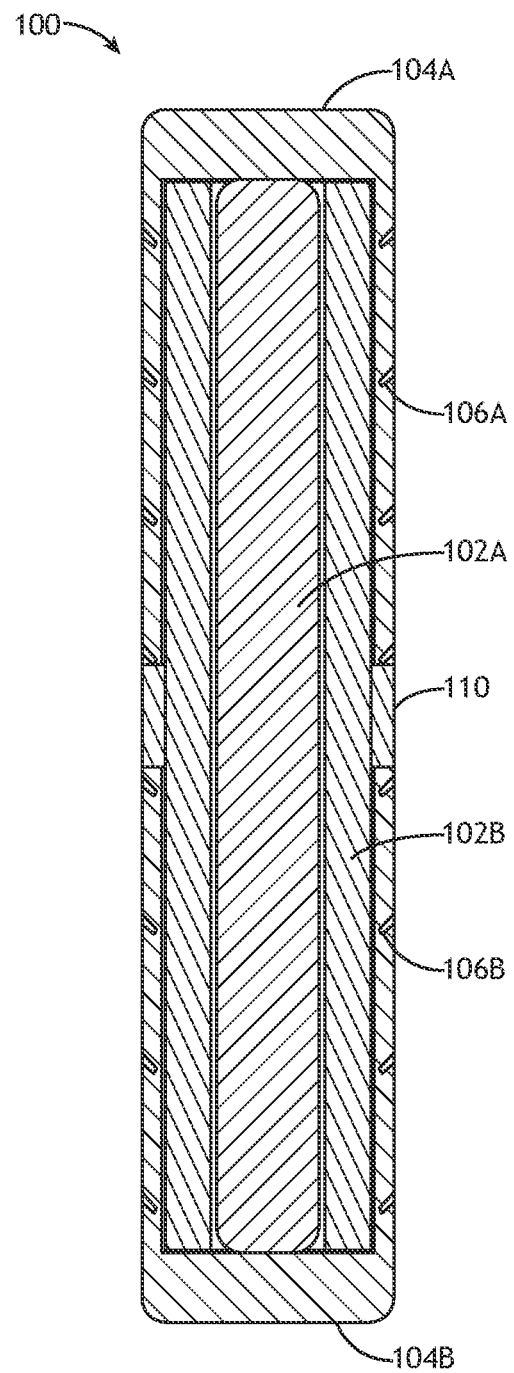
FIG. 3H is a cross-sectional view of the magnetic gearing component of FIG. 3G, in accordance with one or more embodiments of this disclosure.
Figure 3I:
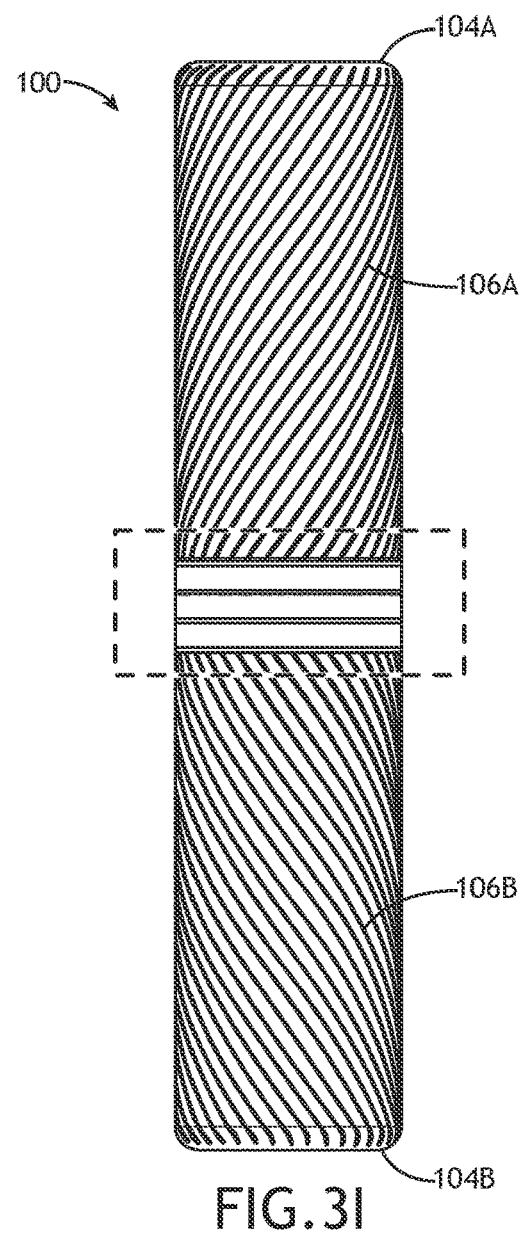
FIG. 3I is a top view of a magnetic gearing component with two endcaps, wherein the separation layer is filled with a plurality of midsection conductors separated from one another by non-conductive washers; in accordance with one or more embodiments of this disclosure.
Figure 3J:
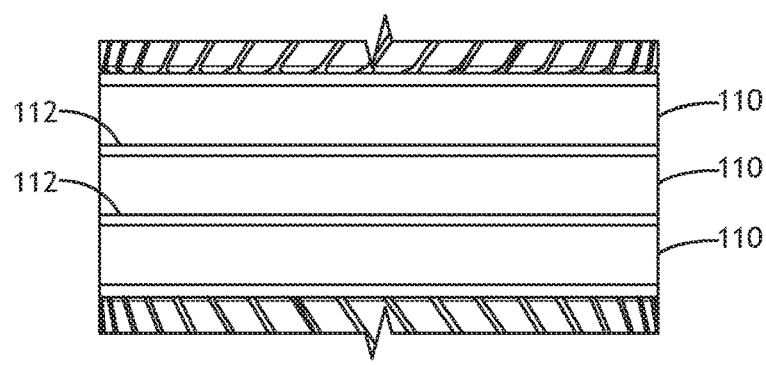
FIG. 3J is a zoomed-in view of the separation layer portion of FIG. 3I, in accordance with one or more embodiments of this disclosure.

Any of the embodiments described above, may include at least one conductive material layer or coil 110, as shown in FIGS. 3G and 3H, filling the midsection or separation layer 108 between the endcaps 104A and 1046. For example, the at least one conductive material layer or coil 110 may comprise a slip ring or, as shown in FIGS. 3I and 3J, a plurality of slip rings 110 separated by plastic washers 112 or any other type of nonconductive separator.

Ring like machine component embodiments are described below. Ring like machine components being according to the usage of this disclosure substantially cylindrical machine components are substantially specified in preceding specifications. This section then specifies only features configurations or usage substantially unique to ring like machine components, elements of the art herein disclosed.

Figure 4A:
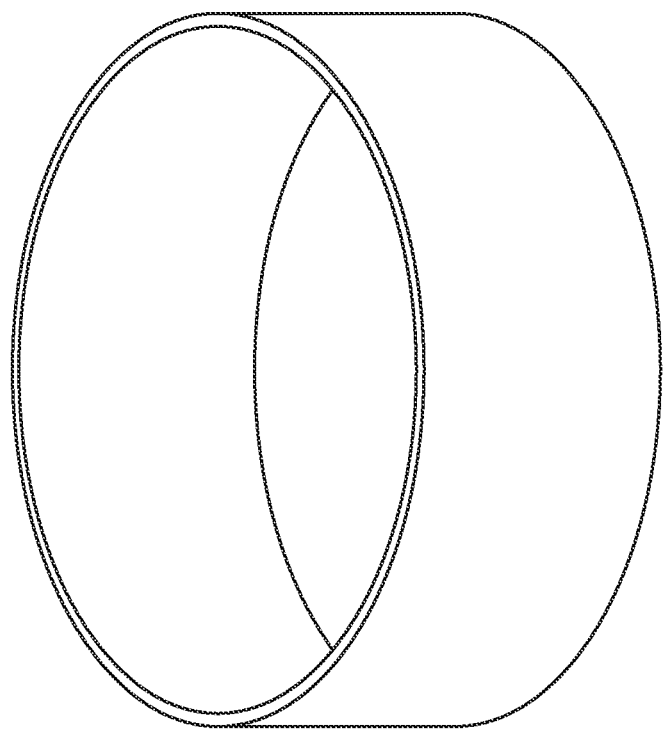
FIG. 4A is a perspective view of ring structure, in accordance with one or more embodiments of this disclosure.
Figure 4B:
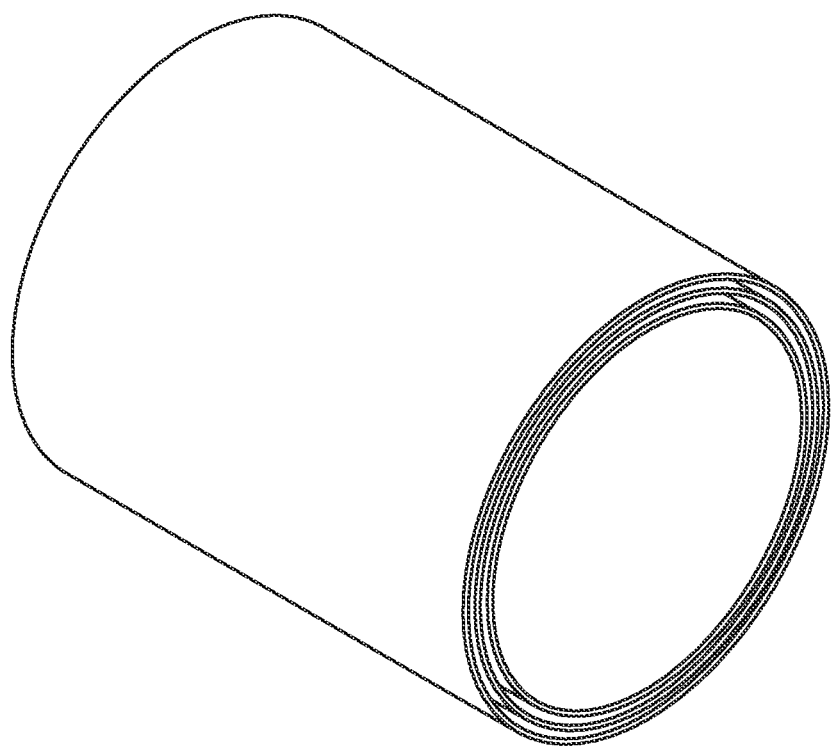
FIG. 4B is a perspective view of a multiple ring structure, in accordance with one or more embodiments of this disclosure.

A plain iron or steel ring having magnetic susceptibility will mesh with other machine components herein described in both a physical and magnetic manner. In such a configuration a plain steel ring may have novel feature to its usage. For example, a plain iron ring machine component (as shown in FIG. 4A) as a design element of a complete system will physically and magnetically mesh with at least one but preferably a plurality of substantially cylindrical magnetically charged fluted and pitched with tooth like flux conducting channels exhibiting both torque transmission and torque bias while the fact that the plain iron or steel ring is not charged nor pitched allows this mesh to be substantially strong, smooth and continuous exhibiting little or no mesh mismatch. If the plain metal ring is composed of spirally wound laminations, then the degree of magnetic mesh and mesh bias is measurably improved. Further, if a ring like machine component is substantially comprised of an inner layer, and outer layer and a magnetically charged core or cores in at least one intermediate layer, then, such a layered, charged, unchanneled ring like machine component will both perform better than the simpler configurations just described but it will in and of itself conform to the simplest form of a substantially cylindrical machine component as previously specified. For example, FIG. 4B illustrates a multiple layer or multiple ring machine component.

Because the cylindrical form of a ring is distinct from the cylindrical form of a roller, it is typically preferable that it be fluted and/or channeled. The inner layer, outer layer, or both inner and outer layers of a ring like machine component may preferably have their edges rolled toward the middle section of said multilayer ring in order to form at least one but preferably both an inner facing and an outer facing endcap.

Naturally, if a roller like machine component has channeled flux conducting means encompassing a magnetically charged core such channels may similarly be rolled over each end of any given roller embodiment forming an endcap means, it is simply a matter of manufacturability that makes this particular embodiment of the herein disclosed means most preferable for the manufacture of ring like machine components.

Figure 4C:
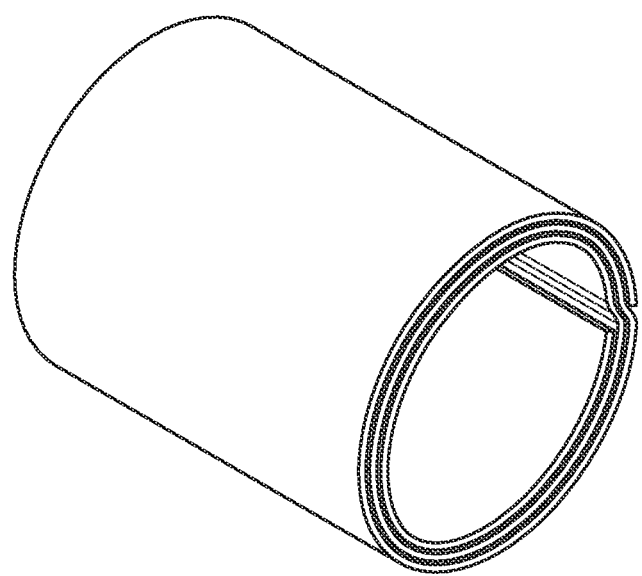
FIG. 4C is a perspective view of a multiple ring structure formed by rolling a sheet of material over itself, in accordance with one or more embodiments of this disclosure.

Another preferred embodiment of a machine component, particularly ring like machine components is substantially comprised of at least one layer spirally wound into at least one but preferably two, or still more preferably three or more layers. For example, FIG. 4C illustrates a multiple layer or multiple ring structure formed by rolling a sheet of material over itself.

Another preferred embodiment of a substantially ring like machine component is substantially comprised of at least one but preferably two, or still more preferably three or more layers of magnetically susceptible material.

Another preferred embodiment of a substantially ring like machine component is substantially comprised of at least three or more layers of magnetically susceptible material. Optionally at least one of inner or outer layers of said multilayer ring like machine component may preferably have tooth like pitched and helically angled flux conducting channels worked into the form or corpus of said inner or outer facing surface, optionally, said inward or outward facing flux conducting channels may be worked into the form or corpus of both said inner and said outer facing radial surfaces. Optionally said inner, said outer, or said both inner and outer facing layers may have a portion of their form rolled in the direction of the radial midsection of said ring like machine component such that a substantially complete endcap form is realized about a preferably magnetically charged or magnetically energized core or cores comprising at least one mid layer of said ring like machine component.

Figure 4D:
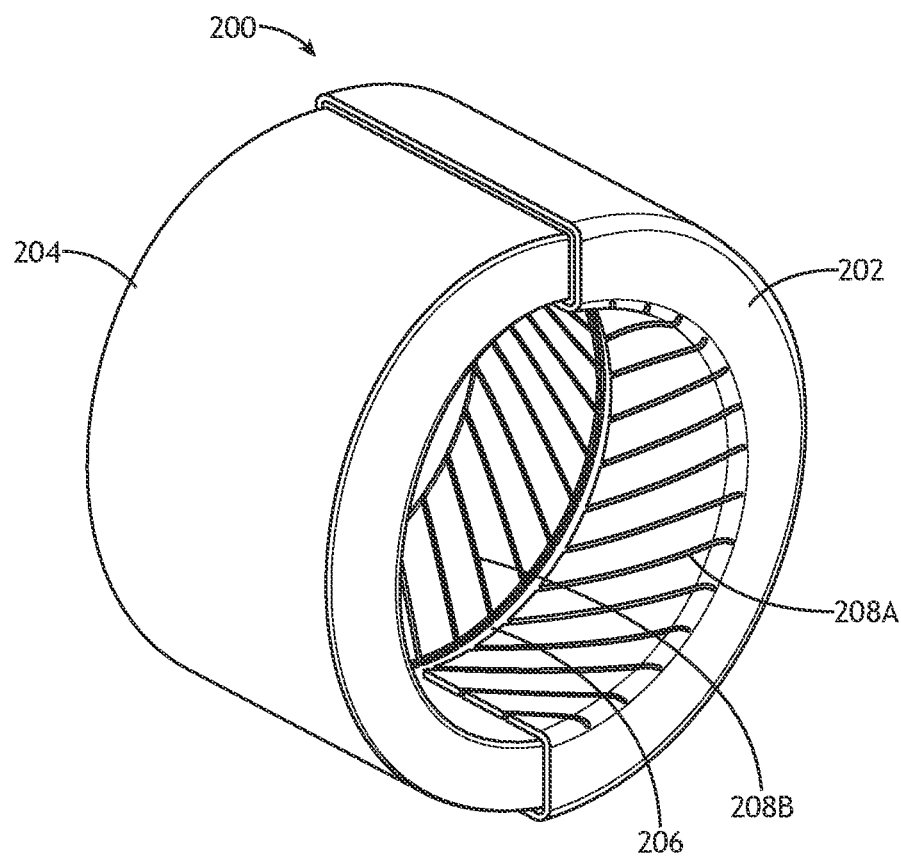
FIG. 4D is a perspective view of a ring structure having a herringbone pattern of flutes formed on an inner surface of the ring structure, in accordance with one or more embodiments of this disclosure.
Figure 4E:
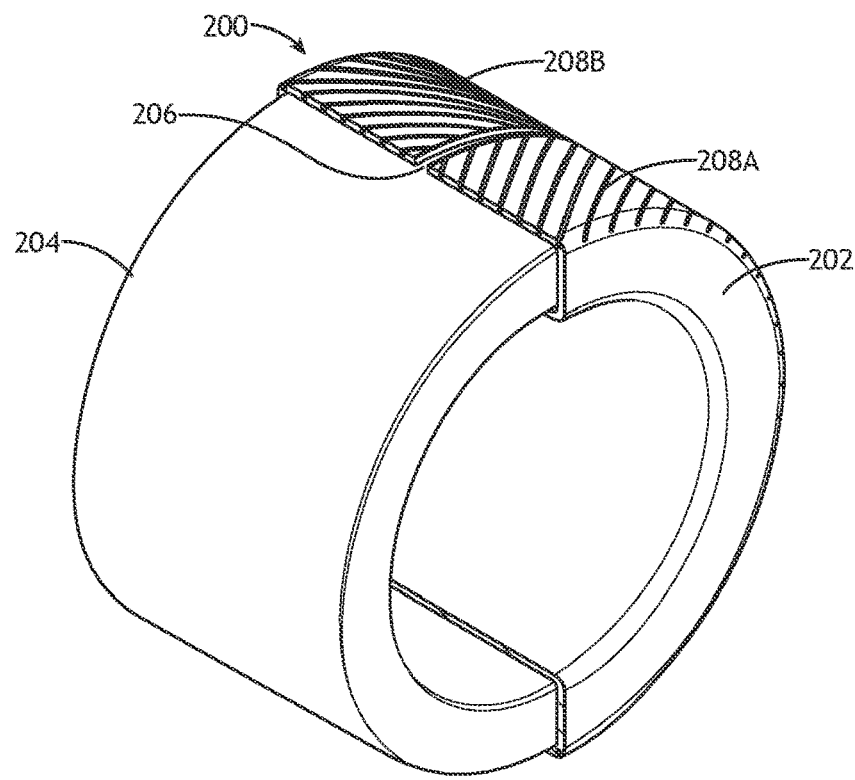
FIG. 4E is a perspective view of a ring structure having a herringbone pattern of flutes formed on an outer surface of the ring structure, in accordance with one or more embodiments of this disclosure.
Figure 4F:
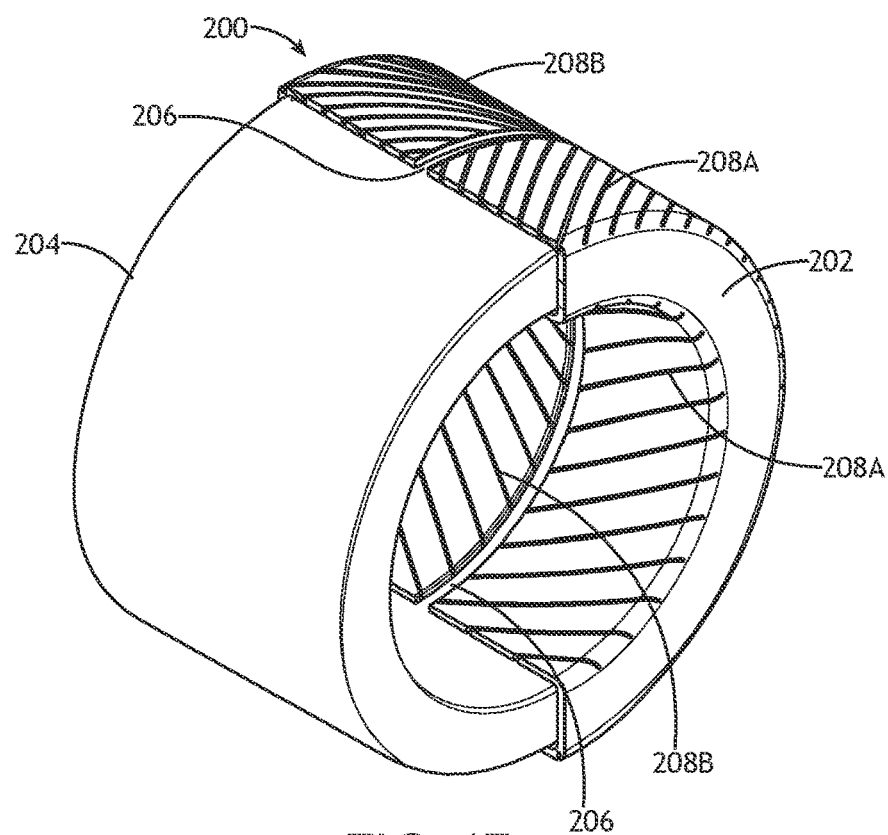
FIG. 4F is a perspective view of a ring structure having a herringbone pattern of flutes formed on an inner surface of the ring structure and also having a herringbone pattern of flutes formed on an outer surface of the ring structure, in accordance with one or more embodiments of this disclosure.

Referring now to FIGS. 4D through 4F, another preferred embodiment of a ring like machine component 200 having a magnetic core 204 substantially comprised of an electrically energized electrically conductive coil encompassed by at least one but less preferably two or more forms of magnetically susceptible material 202, said layer or layers of magnetically susceptible material comprising an radially inner and radially outer surface and at least one but preferably two endcap forms, said inner, said outer, or optionally both inner and outer facing forms having preferably a plurality of helically pitched and angled tooth like forms 208A and 208B comprising a preferably herringbone patterned inner surface (as shown in FIG. 4D), outer surface (as shown in FIG. 4E, or both (as shown in FIG. 4F).

Supposing a designer of machinery wished to make an inwardly facing herringbone patterned magnetically meshing machine component conforming to the art herein disclosed. If a sheet metal strip of suitable gauge and material with similarly angled tooth-like forms slitted about each long edge is rolled about a copper coil and then the metal is roll formed about said coil to form a pair of endcaps and this assembly is then further roll formed such that the tooth like forms substantially complete the enclosure of the copper coil, preferably approaching one another near the midsection of said enclosure while leaving a small midsection separation 206, then the inner surface of the finished assemblage will have preferably a pair of opposed herringbone patterned tooth-like flux conducting channels 208A and 208B. Similarly, if the steel sheet metal is roll formed about the copper coil in an outward facing set of rolling operations an outwardly facing tooth like herringbone pattern can be realized. Further, if such inwardly facing and outwardly facing toothed and herringbone patterned rings are assembled plain outer face to plain inner face a ring assembly can be realized with both inwardly facing herringbone pitch patterns and outwardly facing herringbone pitch patterns.

Similarly, both rings and rollers conforming to the art of this disclosure can be manufactured as electrically conductive coils encompassed round about by cast half rings or half rollers with a parting line near the axial midsection of said machine components.

Many other methods of manufacturing ring like elements of machine components conforming to the art herein disclosed are possible. Another worth particular mention is a three or more layer ring wherein a coercively magnetized core component is substantially encompassed by preferably toothed and pitched inner or outer layers roll formed into a unitary assemblage.

Figure 4G:
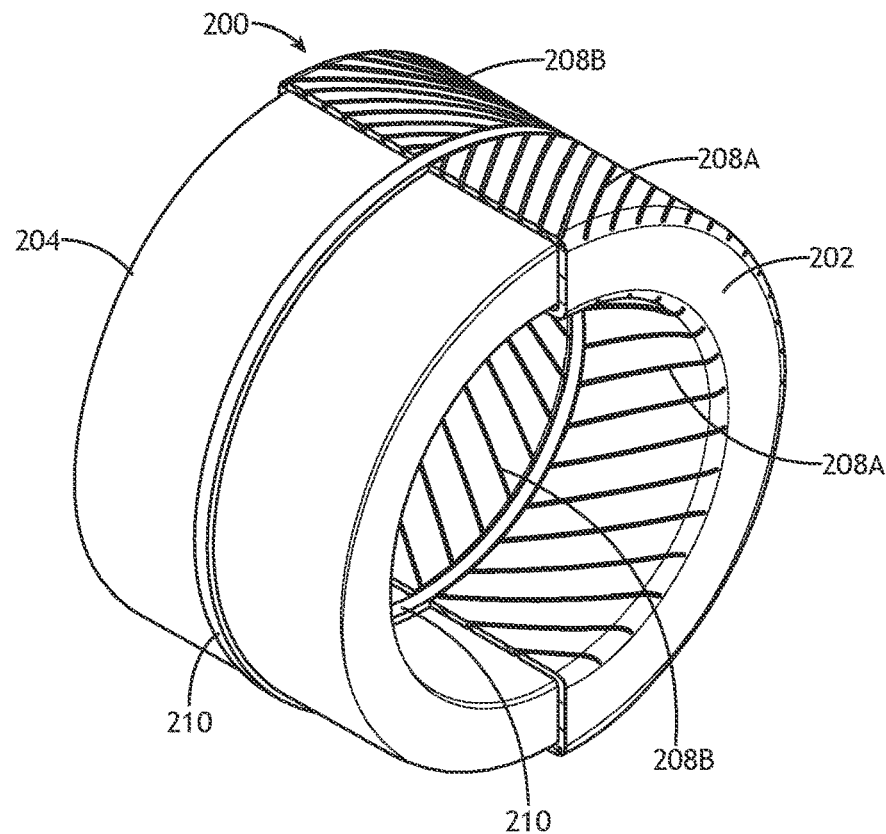
FIG. 4G is a perspective view of a ring structure having a herringbone pattern of flutes formed on an inner surface of the ring structure and also having a herringbone pattern of flutes formed on an outer surface of the ring structure, wherein at least one midsection conductor is disposed within a separation layer between converging flutes, in accordance with one or more embodiments of this disclosure.

In any of the several embodiments of machine components herein described wherein a magnetic core field is created in whole or in part by electrically conductive coils said core field may be optionally subject to external electrical or electronic control. For example, as shown in FIG. 4G, any of the embodiments described above, may include at least one conductive material layer or coil 210 filling the midsection or separation layer 206 between the endcap like structures formed by the magnetically susceptible material 202 that is rolled about the magnetic core 204. For example, the at least one conductive material layer or coil 210 may comprise a slip ring or a plurality of slip rings separated by plastic washers or any other type of nonconductive separator.

Figure 4H:
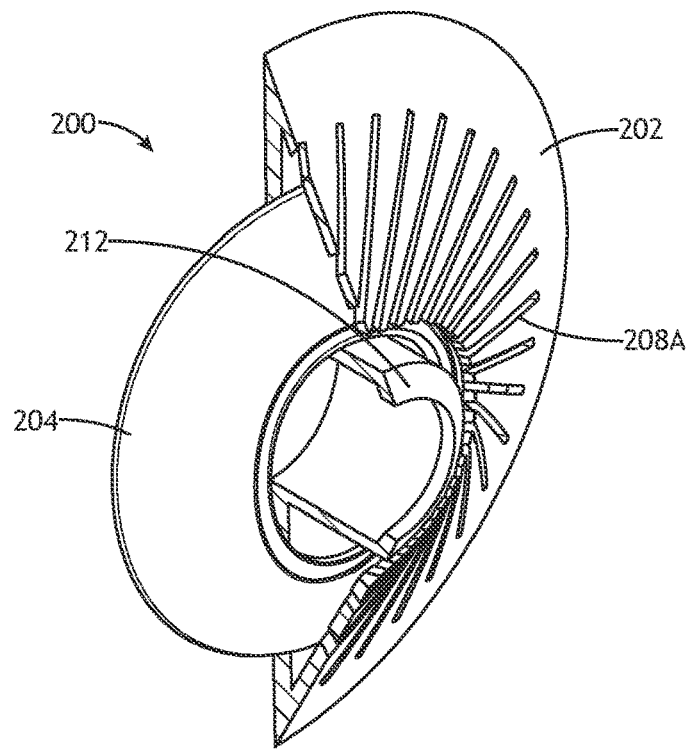
FIG. 4H is a perspective view of a bevel gear structure having a herringbone pattern of flutes formed on an outer surface of the bevel gear structure, in accordance with one or more embodiments of this disclosure.

FIG. 4H illustrates yet another embodiment of a ring like machine component 200 in the form of a bevel gear with a central hub or axle 212.

Belts and segmented tracks are exemplar substantially cylindrical machine components that can be made in accord with the teaching of this disclosure. An application of potentially commercial value is a continuous beltway or conveyor. In such a configuration the supporting and torque transmitting functions of the conveyor system would most preferably be made of a plurality of roller type machine components meshing with a flexible preferably magnetically susceptible material such as the composite material sold under the brand name "rubber steel". This composite product in its present form has magnetic lines of force coerced typically along the longitudinal axis of a ribbon or roll. Such a material could readily be coerced to have a herringbone pattern of tooth like magnetic stripes coerced into its length and said length being then formed into a continuous beltway or conveyor. In such a system the magnetic adhesion of the belt to the supports along with any torque bias obtained could significantly improve the performance of otherwise similar systems currently in use.

Another preferred embodiment of a substantially cylindrical machine component is substantially comprised of a flexible rubber magnetically susceptible continuous belt having at least one but preferably a plurality of helical or still more preferably a plurality of herringbone patterned tooth like magnetic forms coerced into the corpus of said continuous belt. Optionally, said continuous belt could be made of other more rigid magnetically susceptible materials said materials forming a continuous belt or linked track. Rack like machine components can be readily manufactured by methods describing the manufacture of ring like machine components.

Select novel arrangements of machine components embodying the art herein and alternative embodiments are disclosed.

Figure 5A:
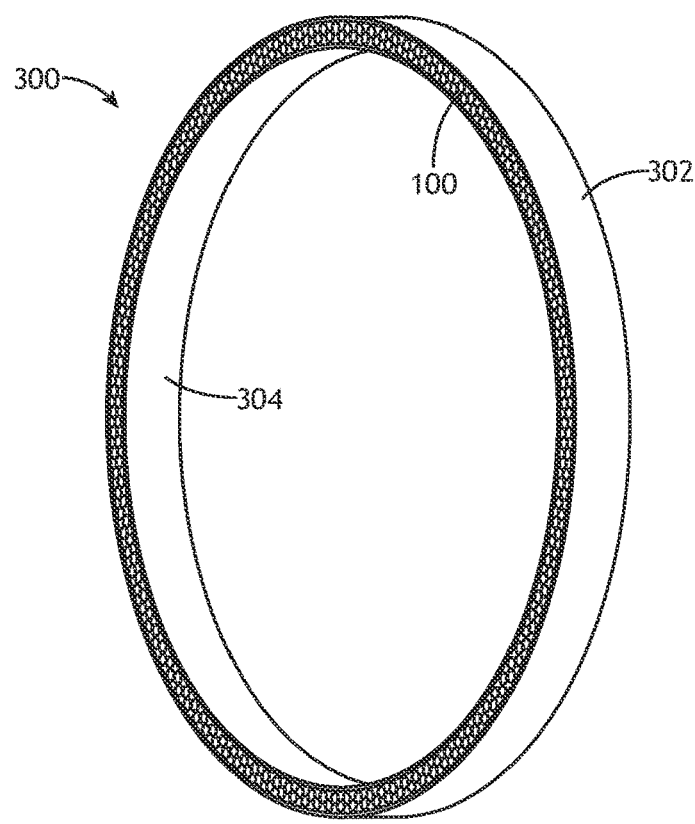
FIG. 5A is a perspective view of two concentric rings with a plurality of rollers disposed between the two concentric rings, in accordance with one or more embodiments of this disclosure.
Figure 5B:
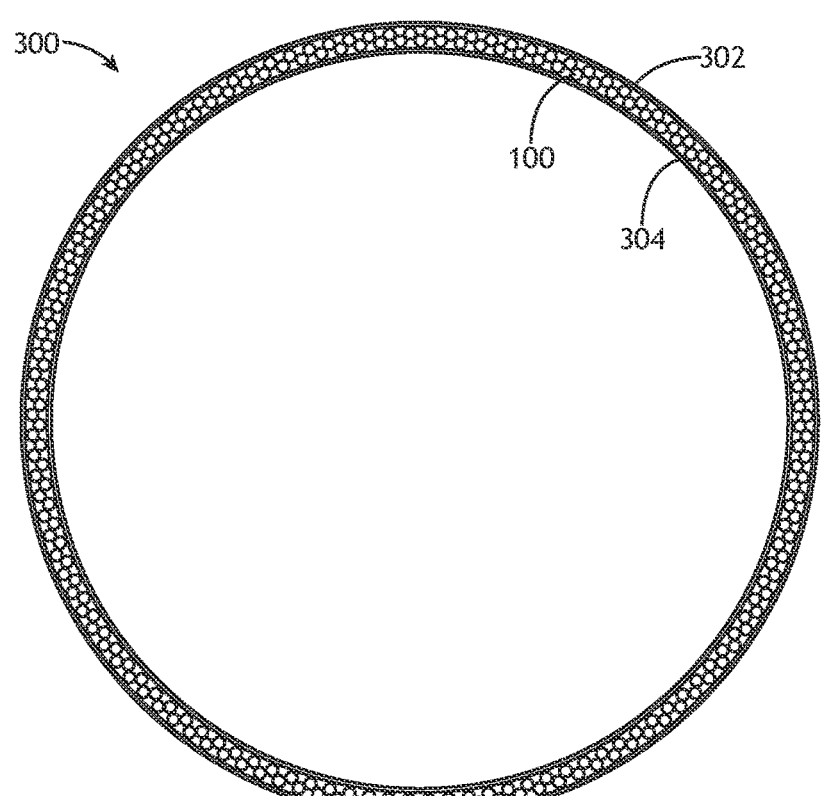
FIG. 5B is a side view of two concentric rings with a plurality of rollers disposed between the two concentric rings, in accordance with one or more embodiments of this disclosure.

FIGS. 5A and 5B illustrate an embodiment of a cylindrical machine component 300 formed by two concentric rings 302 and 304 with a plurality of rollers components (e.g., machine components 100) disposed between the two concentric rings 302 and 304. In such a configuration, the concentric rings 302 and 304 form a closed track that the rollers 100 can circulate within.

Figure 5C:
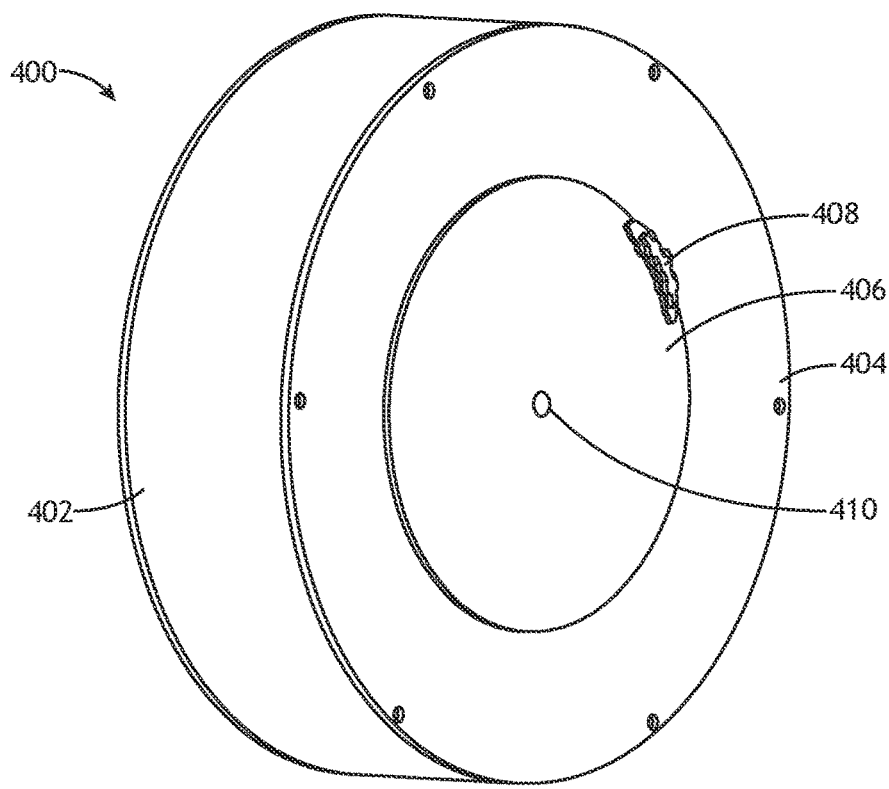
FIG. 5C is a perspective view of a motor housing containing two or more concentric rings with a plurality of rollers disposed between the two or more concentric rings, in accordance with one or more embodiments of this disclosure.
Figure 5D:
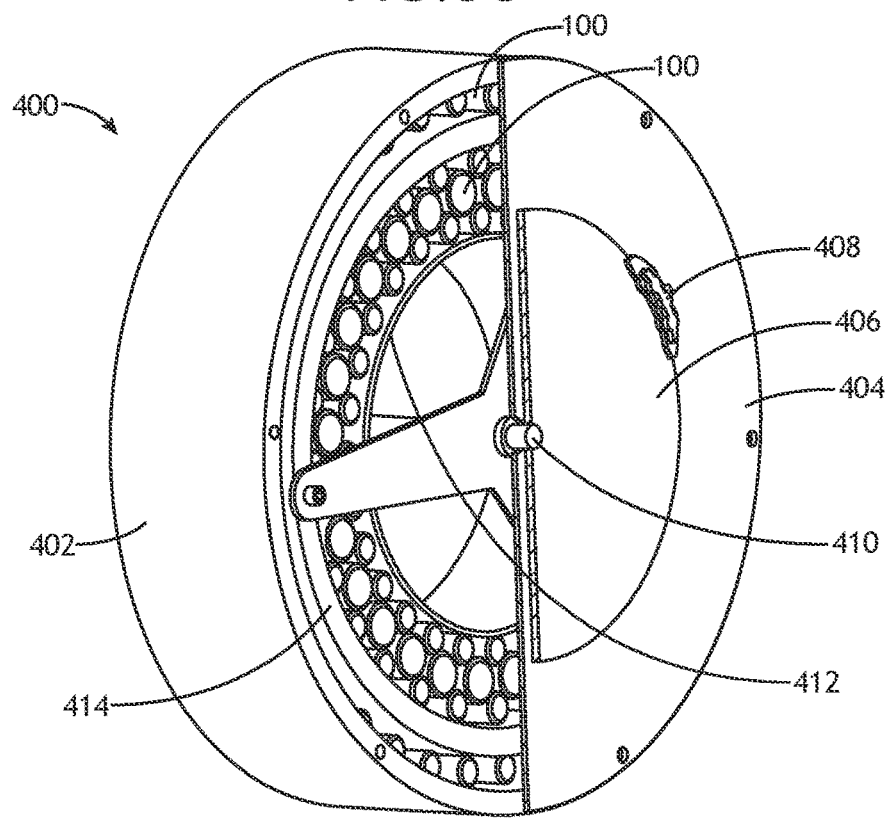
FIG. 5D is a perspective view of a motor housing containing two or more concentric rings with a plurality of rollers disposed between the two or more concentric rings, in accordance with one or more embodiments of this disclosure.

FIGS. 5C and 5D illustrate another embodiment of a cylindrical machine component 400 formed by a motor housing 402 and 404 containing two or more concentric rings 412 and 414 with a plurality of rollers (e.g., machine components 100) disposed between the two or more concentric rings 414 and 414. The rotary motion of the rollers may cause the cylindrical machine component 400 itself to rotate. In some embodiments, another set of rollers is disposed between an outermost ring 414 and the cylindrical portion of the motor housing 402 to act as bearing. The cylindrical machine component 400 may further include a brake plate/disc 406 and brake caliper 408 for selectively slowing or stopping the rotary motion of said component 400 about a central hub or axle 410.

Figure 6A:
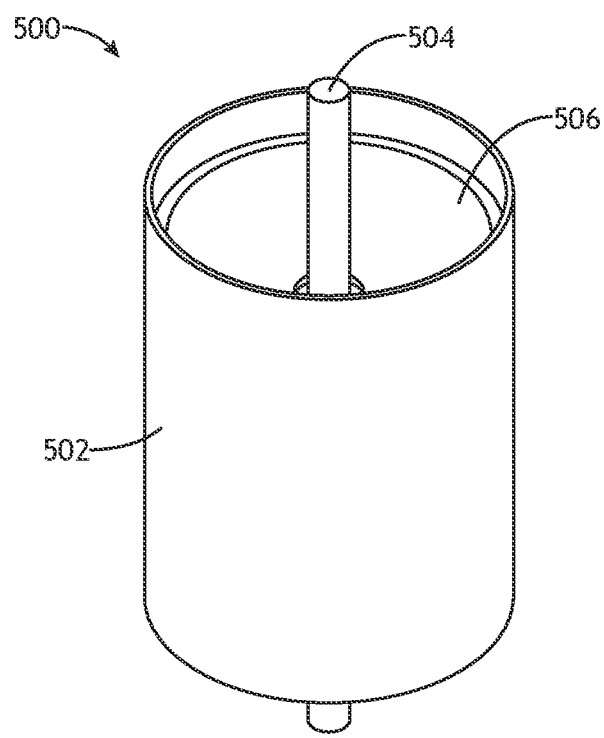
FIG. 6A is a perspective view of a housing containing a plurality of rollers in a capstan configuration, in accordance with one or more embodiments of this disclosure.
Figure 6B:
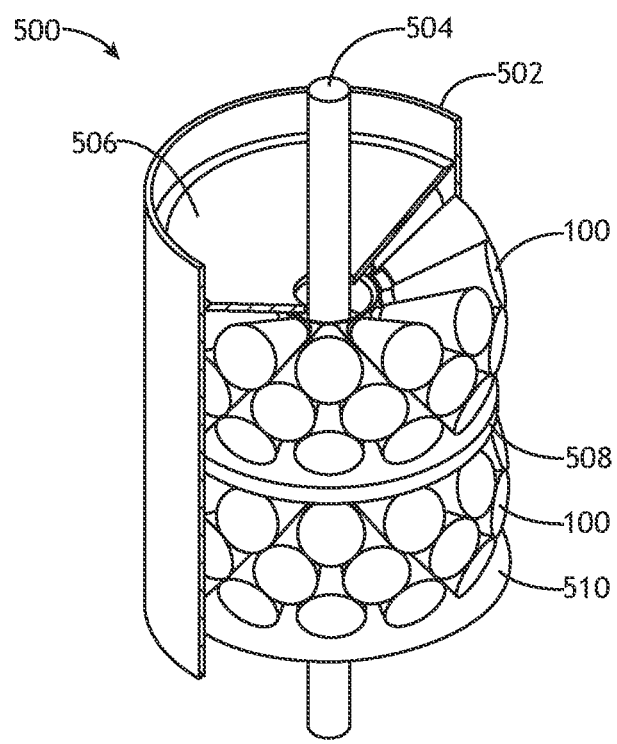
FIG. 6B is a perspective view of a housing containing a plurality of rollers in a capstan configuration, wherein a portion of the housing is removed to show the rollers, in accordance with one or more embodiments of this disclosure.
Figure 6C:
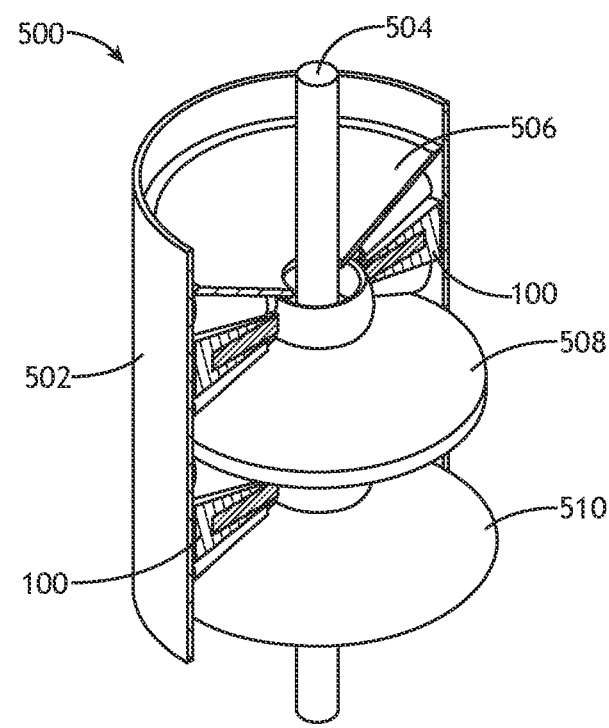
FIG. 6C is a perspective view of a housing containing a plurality of rollers in a capstan configuration, wherein a portion of the housing and the rollers are removed to show a bevel gear component separating a first set of rollers from a second set of rollers, in accordance with one or more embodiments of this disclosure.

FIGS. 6A through 6C illustrate an alternative embodiment of a machine component 500 comprising a plain rod 504 with plurality of concave rollers (e.g., machine components 100) in a recirculating nut like housing 502. This alternative preferred embodiment of the herein disclosed means is substantially comprised of a substantially smooth straight magnetically susceptible rod 504 meshing physically and magnetically with any of the roller like preferred embodiments herein described, said rollers meshing comprising a recirculating chain of rollers, said rollers meshing with said rod substantially comprising a lead screw and lead nut type mesh engagement, said chain of recirculating rollers being constrained in their mesh movements by an encompassing housing 504, said housing having a portion of its internal diameter worked into a spiral channel encompassing said rollers in their mesh engagement, said housing further having an external passage worked into the outer surface of said nut like housing such that the chain of rollers is disengaged from meshing with said rod and are sequentially redirected into said recirculation channel, said recirculating channel being further enclosed in an outer covering 506 and 510 of said nut like housing. Optionally said recirculation channel may be a tubular form independent of said nut like housing and this optional tubular channeling as an alternative to a channel in an encompassing housing is generally applicable to all embodiments described as being housed.

In some embodiments, the machine component 500 may further include a beveled separation structure 508 between an upper set of rollers and a lower set of rollers (as shown in FIG. 6C).

While it may be preferable for the nut like housing 504 to be made of magnetically susceptible material, the separation layer between the preferably several helixes of the nut's interior will preferably be made of a non-magnetic or diamagnetic material.

In the lead screw like assemblage just described the torque bias produced assuming identically chiral rollers with identically oriented polar fields will accumulate in such a manner as to produce a continuous longitudinal force on the rod 504, or more precisely a longitudinal force acting continuously between the nut 506 and rod 504. This force can be countered otherwise in the whole of the machine component 500 or the nut 506 may be clutched to allow it to freely rotate about the rod 504.

Although the functionality of this configuration of machine components is novel the form and function are substantially identical to the form and function of the recirculating ball lead screw and nut it is assumed that suitably skilled people can realize this embodiment based on a general understanding of this prior art.

Figure 7A:
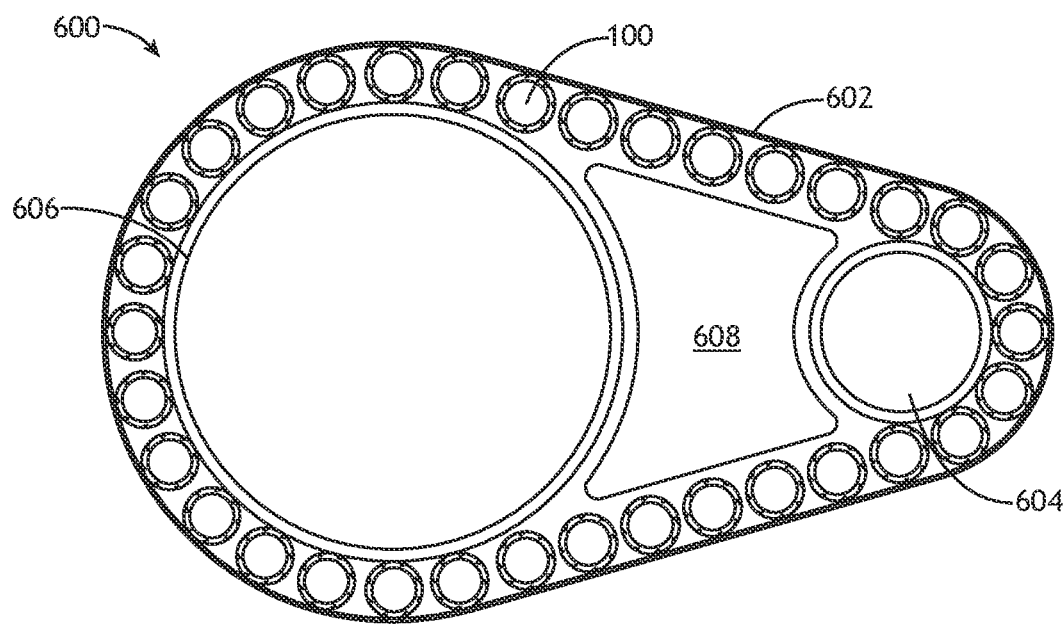
FIG. 7A is a perspective view of a housing containing a plurality of rollers in a chain drive or belt drive like configuration, in accordance with one or more embodiments of this disclosure.
Figure 7B:
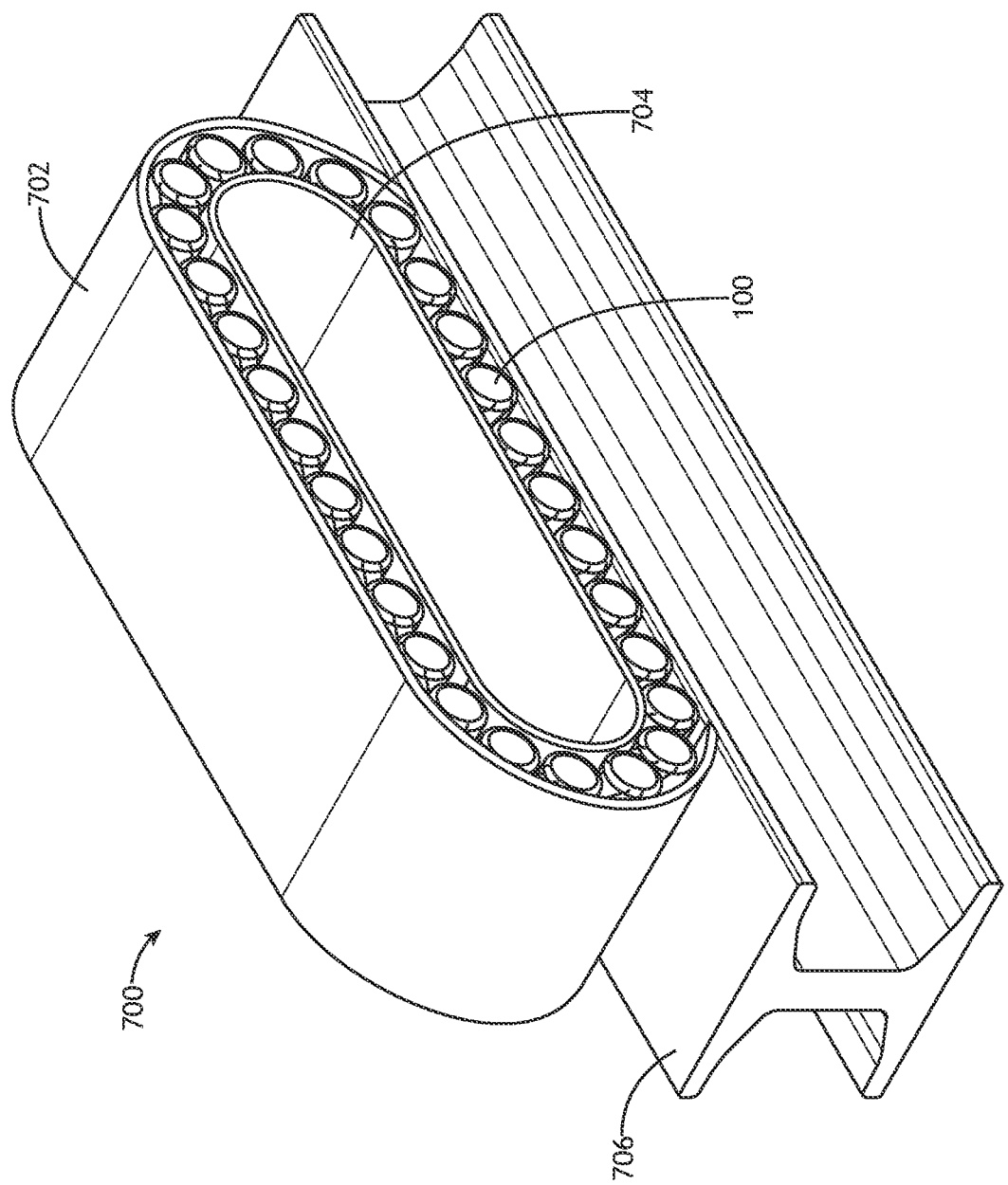
FIG. 7B is a perspective view of a housing containing a plurality of rollers in a bogie like configuration for movement along a track, in accordance with one or more embodiments of this disclosure.

FIGS. 7A and 7B illustrated embodiments including an offset pair of axles, comprising or integral or rigidly attached, pair of sunlike machine components, plurality of substantially cylindrical rollers, in recirculating housing.

In any preferred embodiment of the herein disclosed machine components wherein a plurality of rollers magnetically repulsive to one another are formed into an independently acting chain or belt the flow of rollers may be readily controlled by channels worked in housings or tubular forms of substantially unlimited variability. For this reason, an exhaustive catalogue of configuration is impossible. The following are therefore exemplar and by no means exhaustive or comprehensive.

Referring now to FIG. 7A, a preferred embodiment of a machine component 600 is substantially comprised of at least a pair of axially offset axles 604 and 606, at least one encompassing housing 602 having bearing means surrounding said axles, and a plurality of roller like magnetically and physically meshing rollers (e.g., machine components 100) made according to any preceding preferred embodiment, wherein said rollers mutually meshing with said housing 602 and said first axle 604 circulate freely in passages or channels worked into said housing 602 between said first axle 604 and sequentially said second axle 606 and said housing 602 such that the chain of independently acting rollers engages first one axle and then the other such that the rollers act like a meshing belt or chain, and the axles are thereby substantially constrained in their rotation with a given ratio. In some embodiments, the axles 604 and 606 are separated by a metal (e.g., aluminum) midsection 608 to constrain the movement of the rollers to a path along an inner surface of the housing 602.

In another preferred embodiment similar to the preceding embodiment the circulating chain of independently acting rollers cross one another in separate circulation channels such that the shafts are constrained to counter rotate.

Either of these preferred embodiments should be considered favorably by a machine designer in comparison to the simpler single magnetic mesh engagement of a spur gear like arrangement. In the means herein disclosed the degree of mesh engagement and transmissible torque are dependent on the total number of mesh engagements and for this reason systems wherein a plurality of rollers mutually mesh with both at least one but preferably at least two or more shafts mutually meshing with a magnetically susceptible housing will naturally have a greater degree of engagement a higher transmissible torque and improved torque bias.

Naturally if an even greater degree of mesh engagement is desired then larger diameter capstans may be rigidly attached to or integrally made as components of said axles. Further improvement can be realized if these substantially cylindrical capstans have pitched patterns of toothlike magnetic forms worked into or rigidly attached to their circumferential surfaces.

FIG. 7B illustrates another preferred embodiment of a bogie like machine component 700 with rollers (e.g., machine components 100) disposed within a housing 702 that includes an inner loop 704 to constrain the movement of the rollers to a path along an inner surface of the housing 704, wherein a bottom portion of the housing 702 is open to allow the roller to rotate against a track 706 (e.g., rack or rail) such that the machine component 700 is propelled along the track 706. Alternatively, the housing 702 may comprise a closed belt, chain, or other movable outer casing that is rotated about the inner loop 704 as a result of the rotatory motion of the rollers.

Figure 8:
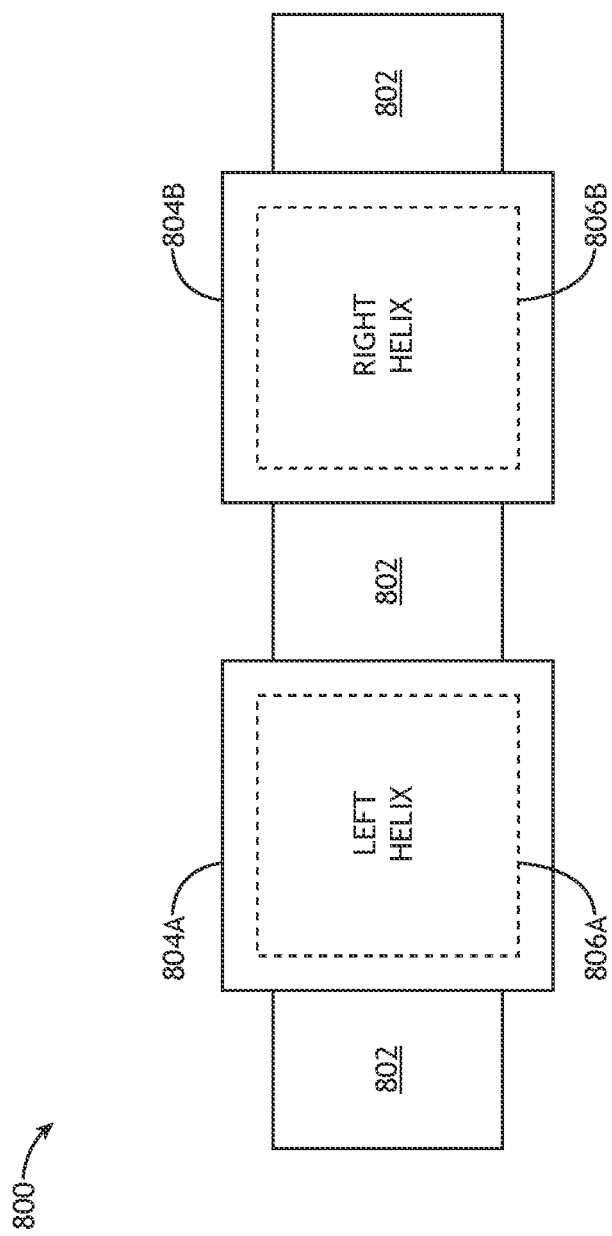
FIG. 8 is a block diagram illustrating an alternative configuration of rollers, in accordance with one or more embodiments of this disclosure.

Referring now to FIG. 8, another preferred embodiment of a substantially cylindrical machine component 800 is formed by a plurality of magnetic cores 802 (e.g., button magnets) separated by endcap like components 804A and 804B having helical flux conducting channels 806A and 806B (e.g., helical flutes) with alternating direction such that each set of two components 804A and 804B forms a herringbone pattern with a magnetic core 802 therebetween and a magnetic core 802 on either end of the machine component 800. The centrally located magnetic core 802 acts as a separation layer between components 804A and 804B; however, in other embodiments the magnetic core 802 may be replaced or supplemented by other separation layer materials, such as, but not limited to any of the separation layer materials described herein. Said machine components 800 may be daisy chained to form a chain of rollers.

Other alternative embodiments are described below.

The magnetic core of any of the several embodiments of machine components previously described may less preferably be split into two halves wherein a north south pole is made external to the meshing pitch pattern and another south north pole is added to an opposed end of said machine component. Such a split magnetically bipolar core field can be made to function in a manner very much like the more preferred centrally located polar field however, the split pole configuration will be more costly for a given performance as well as having much greater tendency to electromagnetically radiate and to generate typically undesirable external magnetic interaction between various machine components or the external environment. The specification of this generally less preferred embodiment is herein incorporated into the specifications of this disclosure primarily as a means of defense of the intellectual property rights of the embodiments herein disclosed as more preferable.

Another generally less preferable embodiment of the herein disclosed means is substantially identical to those preceding except that the magnetic polarity of the mesh engagement(s) between meshing machine components is made repulsive in nature. Such configurations are functional but the significant difficulty of assembling and maintaining the dynamic positions of engaging machine members make these embodiments generally less preferable. These magnetically repulsive embodiments are described and incorporated in the specification of this disclosed means primarily for defensive purposes, however, there are almost certainly some select applications where mesh in opposition is desirable. In such applications care should be taken to constrain the dynamic and repulsive magnetic force present especially under conditions of a systemic failure of any kind.

Although the invention has been described with reference to embodiments illustrated in the attached drawings, equivalents or substitutions may be employed without departing from the scope of the invention as recited in the claims. Components illustrated and described herein are examples of devices and components that may be used to implement embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A magnetic gearing component, comprising:
   a magnetic core, wherein the magnetic core comprises two or more magnetic cores;
   an endcap adjacent to the magnetic core;
   a plurality of helical flutes formed on a surface of the endcap, wherein the plurality of helical flutes converge with a second plurality of helical flutes formed on a surface of a second endcap; and
   a separation layer between the endcap and the second endcap.

2. The magnetic gearing component of claim 1, wherein the separation layer comprises at least one of a midsection separation layer, a core separation layer, and a flux conducting separation layer.

3. The magnetic gearing component of claim 1, further comprising:
   a midsection conductor between the endcap and the second endcap.

4. The magnetic gearing component of claim 1, wherein the endcap surrounds a portion of the magnetic core.

5. The magnetic gearing component of claim 1, wherein the endcap and the second endcap are on opposite ends of the magnetic core.

6. The magnetic gearing component of claim 1, wherein the magnetic core comprises a permanent magnet.

7. The magnetic gearing component of claim 1, wherein the magnetic core comprises an electromagnet.

8. The magnetic gearing component of claim 1, wherein the magnetic core comprises a permanent magnet and an electromagnet.

9. The magnetic gearing component of claim 1, wherein the two or more magnetic cores are axially aligned, opposing poles facing.

10. The magnetic gearing component of claim 1, wherein the endcap comprises a sleeve including the plurality of helical flutes rolled over an end of the magnetic core.

11. The magnetic gearing component of claim 1, wherein the endcap comprises a substantially planar surface adjacent to and magnetically transmissive to at least one flux conducting channel.

12. The magnetic gearing component of claim 1, wherein the endcap comprises an encompassing form rolled about the magnetic core with flux conducting channels worked into edges of the encompassing form such that the flux conducting channels form a herringbone pattern of toothlike flux conducting channels.

13. The magnetic gearing component of claim 1, wherein the separation layer comprises an air gap.

14. A magnetic gearing component, comprising:
a magnetic core;
an endcap adjacent to the magnetic core, wherein the endcap comprises a specially demagnetized region of a peripheral surface of the magnetic gearing component, and wherein the magnetic core comprises a magnetized region of the magnetic gearing component;
a plurality of helical flutes formed on a surface of the endcap, wherein the plurality of helical flutes converge with a second plurality of helical flutes formed on a surface of a second endcap; and
a separation layer between the endcap and the second endcap.

15. The magnetic gearing component of claim 14, wherein the separation layer comprises at least one of a midsection separation layer, a core separation layer, and a flux conducting separation layer.

16. The magnetic gearing component of claim 14, further comprising:
a midsection conductor between the endcap and the second endcap.

17. The magnetic gearing component of claim 14, wherein the endcap surrounds a portion of the magnetic core.

18. The magnetic gearing component of claim 14, wherein the endcap and the second endcap are on opposite ends of the magnetic core.

19. The magnetic gearing component of claim 14, wherein the endcap comprises a substantially planar surface adjacent to and magnetically transmissive to at least one flux conducting channel.

20. The magnetic gearing component of claim 14, wherein the separation layer comprises an air gap.

* * * * *